(12) United States Patent
Padgett et al.

(10) Patent No.: US 10,780,628 B2
(45) Date of Patent: Sep. 22, 2020

(54) APPARATUS AND METHOD FOR FABRICATING THREE-DIMENSIONAL OBJECTS

(71) Applicant: Fusion3 Design LLC, Greensboro, NC (US)

(72) Inventors: Katelyn Padgett, Greensboro, NC (US); David Padgett, Greensboro, NC (US)

(73) Assignee: FUSION3 DESIGN LLC, Greensboro, NC (US)

( * ) Notice: Subject to any disclaimer, the term of this patent is extended or adjusted under 35 U.S.C. 154(b) by 504 days.

(21) Appl. No.: 14/803,743

(22) Filed: Jul. 20, 2015

(65) Prior Publication Data

US 2016/0144564 A1 May 26, 2016

Related U.S. Application Data

(60) Provisional application No. 62/026,435, filed on Jul. 18, 2014.

(51) Int. Cl.
| | |
|---|---|
| *B29C 64/343* | (2017.01) |
| *B29C 64/209* | (2017.01) |
| *B29C 64/236* | (2017.01) |
| *B29C 64/245* | (2017.01) |
| *B29C 64/321* | (2017.01) |
| *B33Y 30/00* | (2015.01) |
| *B29C 64/118* | (2017.01) |
| *B29C 64/232* | (2017.01) |

(Continued)

(52) U.S. Cl.
CPC .......... *B29C 64/118* (2017.08); *B29C 64/209* (2017.08); *B29C 64/227* (2017.08); *B29C 64/232* (2017.08); *B29C 64/236* (2017.08); *B29C 64/245* (2017.08); *B29C 64/295* (2017.08); *B29C 64/321* (2017.08); *B29C 64/343* (2017.08); *B29L 2031/00* (2013.01); *B33Y 30/00* (2014.12)

(58) Field of Classification Search
CPC ..... B33Y 30/00; B29C 64/106; B29C 64/118; B29C 64/20; B29C 64/209; B29C 64/227; B29C 64/295; B29C 64/321; B29C 64/343; B29C 64/232; B29C 64/236; B29C 64/245
See application file for complete search history.

(56) References Cited

U.S. PATENT DOCUMENTS

| | | | | |
|---|---|---|---|---|
| 5,340,433 | A | * | 8/1994 | Crump .................... B22F 3/115 118/202 |
| 5,349,833 | A | * | 9/1994 | Pardee .................... B01D 8/00 62/55.5 |

(Continued)

FOREIGN PATENT DOCUMENTS

EP 0833237 B1 9/2001

*Primary Examiner* — Xiao S Zhao
*Assistant Examiner* — Joseph S Leyson
(74) *Attorney, Agent, or Firm* — Taylor English Duma LLP

(57) ABSTRACT

An apparatus for making three-dimensional objects comprises a movable dispensing head to dispense in a fluid state a supply of flexible strand of thermoplastic resin material. Two motors are provided for moving said dispensing head relative to a base member in an x, y plane in a predetermined sequence and pattern. A heater heats flexible strand to a predetermined temperature above the solidification temperature of said material.

7 Claims, 29 Drawing Sheets

(51) Int. Cl.
*B29C 64/295* (2017.01)
*B29C 64/227* (2017.01)
*B29L 31/00* (2006.01)

(56) References Cited

U.S. PATENT DOCUMENTS

| | | | | |
|---|---|---|---|---|
| 5,368,400 | A | * | 11/1994 | Cyphert ................ B44B 5/0019 101/28 |
| 6,070,480 | A | * | 6/2000 | Kerschner .............. B23Q 1/621 74/89.2 |
| 6,722,872 | B1 | | 4/2004 | Swanson et al. |
| 8,033,811 | B2 | | 10/2011 | Swanson et al. |
| 2001/0030383 | A1 | * | 10/2001 | Swanson ................ B29C 41/36 264/308 |
| 2004/0131675 | A1 | * | 7/2004 | Yamamoto .............. A61J 3/007 424/465 |
| 2007/0228590 | A1 | | 10/2007 | Labossiere et al. |
| 2010/0021580 | A1 | | 1/2010 | Swanson et al. |
| 2013/0078073 | A1 | * | 3/2013 | Comb .................... F16H 19/06 414/749.1 |
| 2015/0145174 | A1 | * | 5/2015 | Comb ................ G03G 15/224 264/464 |

* cited by examiner

APPARATUS AND METHOD FOR FABRICATING THREE-DIMENSIONAL OBJECTS

CROSS-REFERENCES

This application is related to United States provisional application No. 62/026,435, filed Jul. 18, 2014, entitled "3-DIMENSIONAL PRINTER", naming Chris Padgett and David Padgett as the inventors. The contents of the provisional application are incorporated herein by reference in their entirety, and the benefit of the filing date of the provisional application is hereby claimed for all purposes that are legally served by such claim for the benefit of the filing date.

BACKGROUND

An apparatus and method for fabricating three-dimensional objects using additive process modeling techniques is described and, more particularly, an apparatus and method incorporating unique linear motion systems and control for relative movement of the components of the apparatus in three dimensions.

The field of and additive modeling and manufacturing systems is commonly known as three-dimensional ("3D") printing. Additive machines, such as 3D printers, make three-dimensional models by incremental deposition of a modeling material on a surface, usually in planar layers, based upon design data provided from a computer aided design (CAD) system. A mathematical description forming the CAD model of a 3D object to be created is split into multiple layers. For each layer, a host computer, or controller, generates a path for depositing the material to form the 3D object. The layers are individually applied and shaped to produce the final part.

An additive machine comprises a print head including an extruder for dispensing heated flowable modeling material from a nozzle onto a surface of a build platform. The controller controls movement of the print head in a horizontal x, y plane, the build platform in a vertical z-direction, and the feeding of modeling material into the print head. The modeling material is thus deposited at a desired flow rate layer-by-layer in areas defined from the CAD model as the print head and the surface are moved relative to each other in three dimensions by an x-y-z gantry system. Movement of the print head is performed under computer control, in accordance with build data from a host computer. The result is a 3D object that resembles the CAD model. The modeling material thermally solidifies after it is deposited, and the finished 3D model is removed from the surface.

A drive system for the print head should minimize backlash. The extruder frequently changes directions when stopping and restarting the flow of molten plastic. Any slop in the drivetrain will result in poor performance at the start and stop points. Precise control of the start and stop function within the extruder is essential for producing parts with complex geometries or parts printed as a final assembly with moving parts within it.

In a conventional print head, a Bowden extruder has an extruder motor assembly mounted separately from the moving print head. A feed gear located in the motor assembly grips a filament of feed material. A somewhat flexible, low friction PTFE tube joins the output of the feed gear to the print head. The feed material filament is fed through the tube in a sliding motion as it is melted and extruded at the print head. The tube must be stiff enough to counteract the pushing force the extruder exerts on the filament. However, backlash is high due to several factors, including the gap between the filament and tube ID, the filament acts as a compression spring, slop in the tube end retention within the extruder and print head assembly, and axial tube distortion. There are limitations for a high axial stiffness, off-axis flexible, yet low-friction tubing material. The approach also places an upper limit on print speed due to filament compression and relaxation effects, which results in excess material buildup during deceleration of the print head and thinning out of material during acceleration.

For the foregoing reasons, there is a need to improve the relative three-axes movement of a print head of an apparatus for fabricating three-dimensional objects.

SUMMARY

An apparatus for making three-dimensional physical objects of predetermined shape by sequentially depositing multiple layers of solidifying material on a base member in a desired pattern, the apparatus comprising:

a movable dispensing head (112) having a flow passage (124) therein in flow communication at one end thereof with a dispensing outlet configured in the form of a tip with a discharge orifice (126) of predetermined size therein to dispense material in a fluid state;

a supply of flexible strand of thermoplastic resin material that solidifies by cooling to a solidification temperature; heated relatively rapidly to a temperature just above its solidification temperature and will solidify due to a drop in temperature upon being dispensed onto said base member;

means for supplying said material in a fluid state through said flow passage to said dispensing outlet;

a delivery surface disposed in working proximity to said dispensing outlet of said dispensing head;

means for moving said dispensing head and said base member relative to each other in three dimensions in a predetermined sequence and pattern with respect to said dispensing outlet; and means for metering the discharge of said material in a fluid state from said discharge orifice onto said base member as said dispensing head and base member are moved relative to each other so as to thus form a three-dimensional object, characterised in that:

material is provided to said movable dispensing head in the form of a continuous flexible strand;

said means for supplying said material in a fluid state comprises a heater (128) on said dispensing head proximate said flow passage that heats said flexible strand to a predetermined temperature above the solidification temperature of said material; and said means for metering comprises a material advance mechanism operatively associated with said flexible strand which controllably advances said flexible strand towards said flow passage at an advance rate controlled in relation to said mechanism means, to thereby regulate the flow rate of said material in a fluid stream from said discharge orifice in relation to the relative movement of said discharge head and said base member;

said material advance mechanism comprises one or more roller pairs that grip said flexible strand therebetween and a speed-controlled driver motor (142) that supplies rotational power to said roller pairs.

BRIEF DESCRIPTION OF THE DRAWINGS

For a more complete understanding of the apparatus and method, reference should now be had to the embodiments shown in the accompanying drawings and described below. In the drawings.

DESCRIPTION

Figure 1:
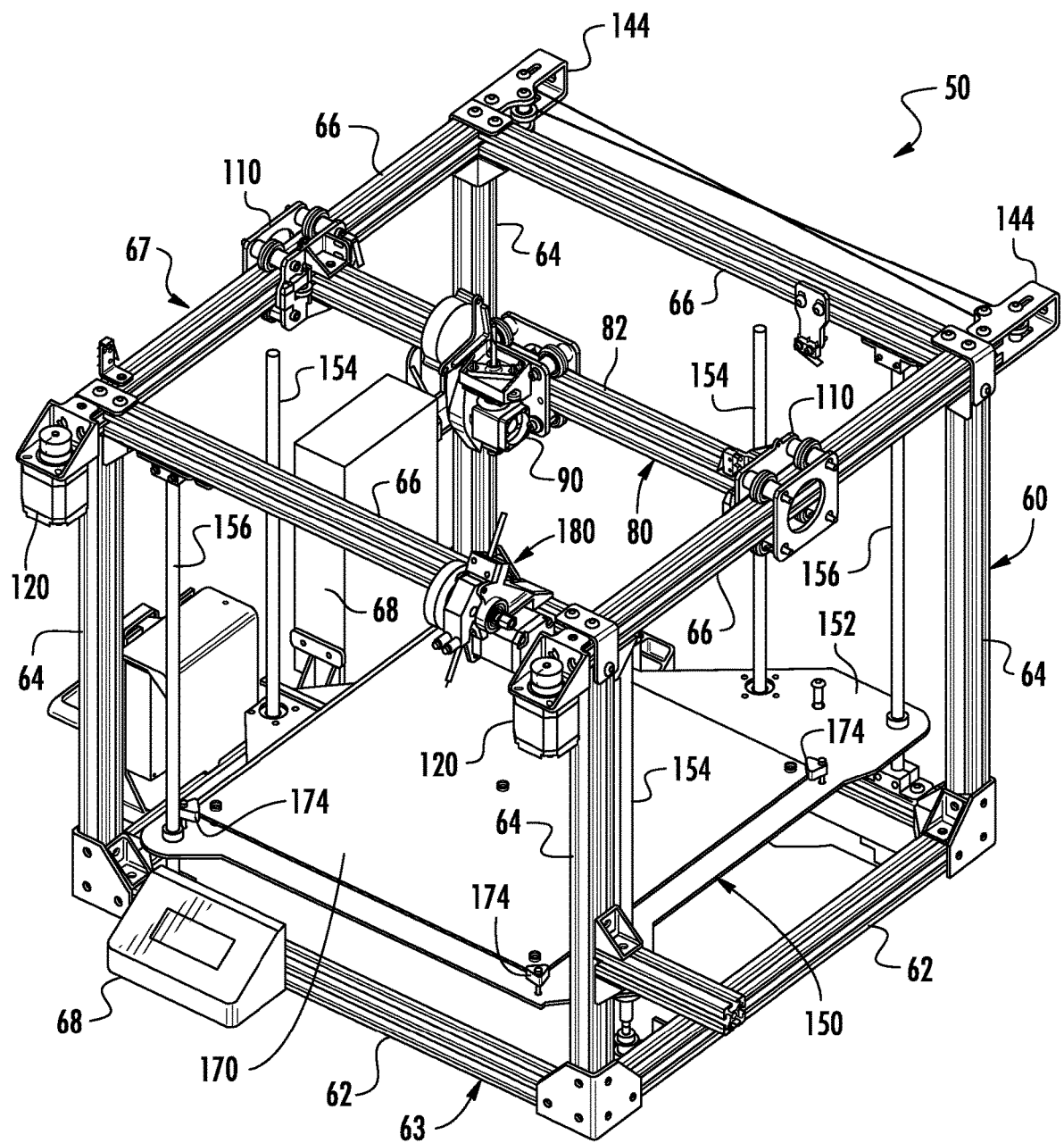
FIG. 1 is a top perspective view of an embodiment of an apparatus for fabricating three-dimensional objects.
Figure 1A:
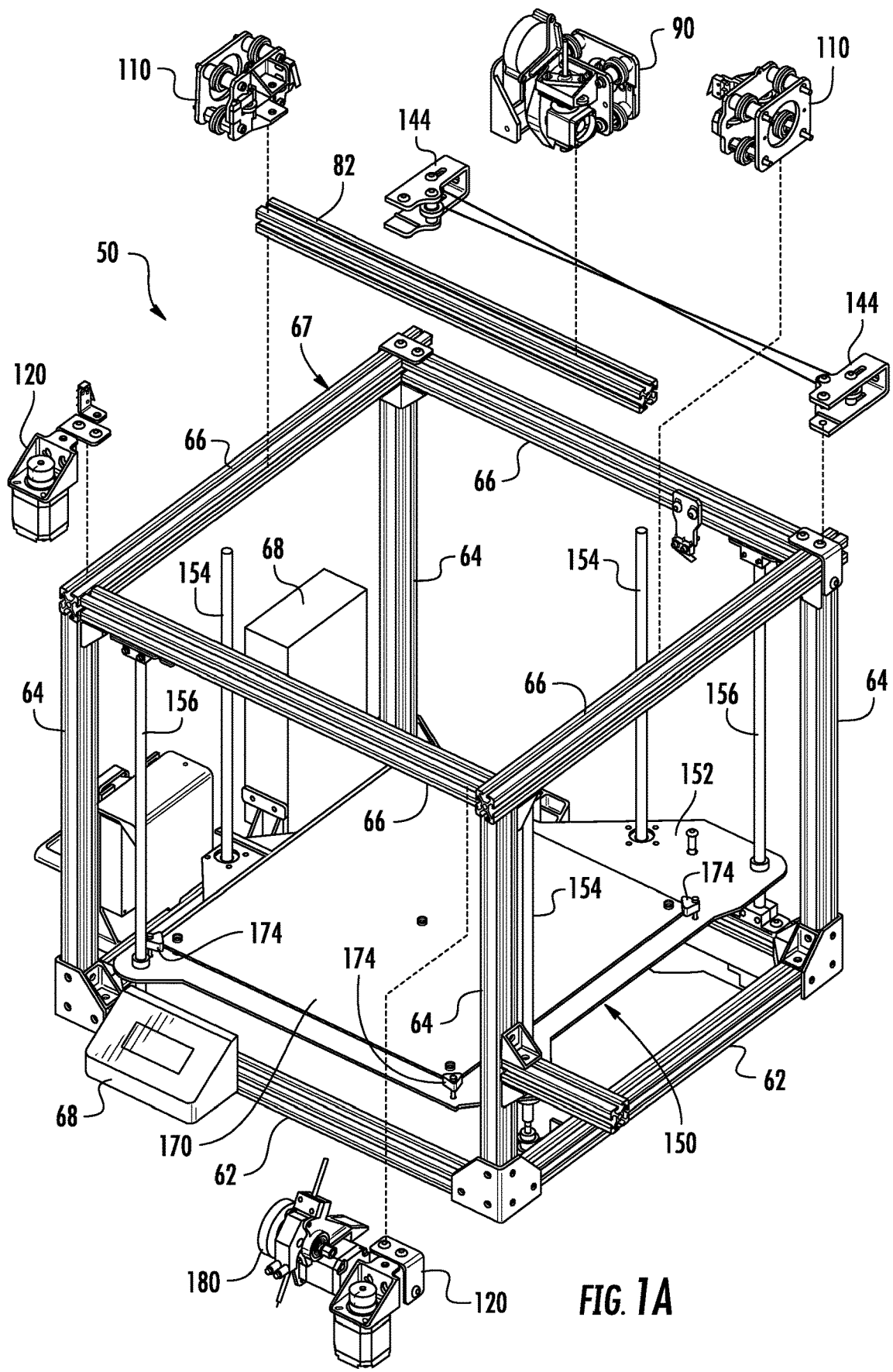
FIG. 1A is a top exploded perspective view of the apparatus for fabricating three-dimensional objects as shown in FIG. 1.
Figure 2:
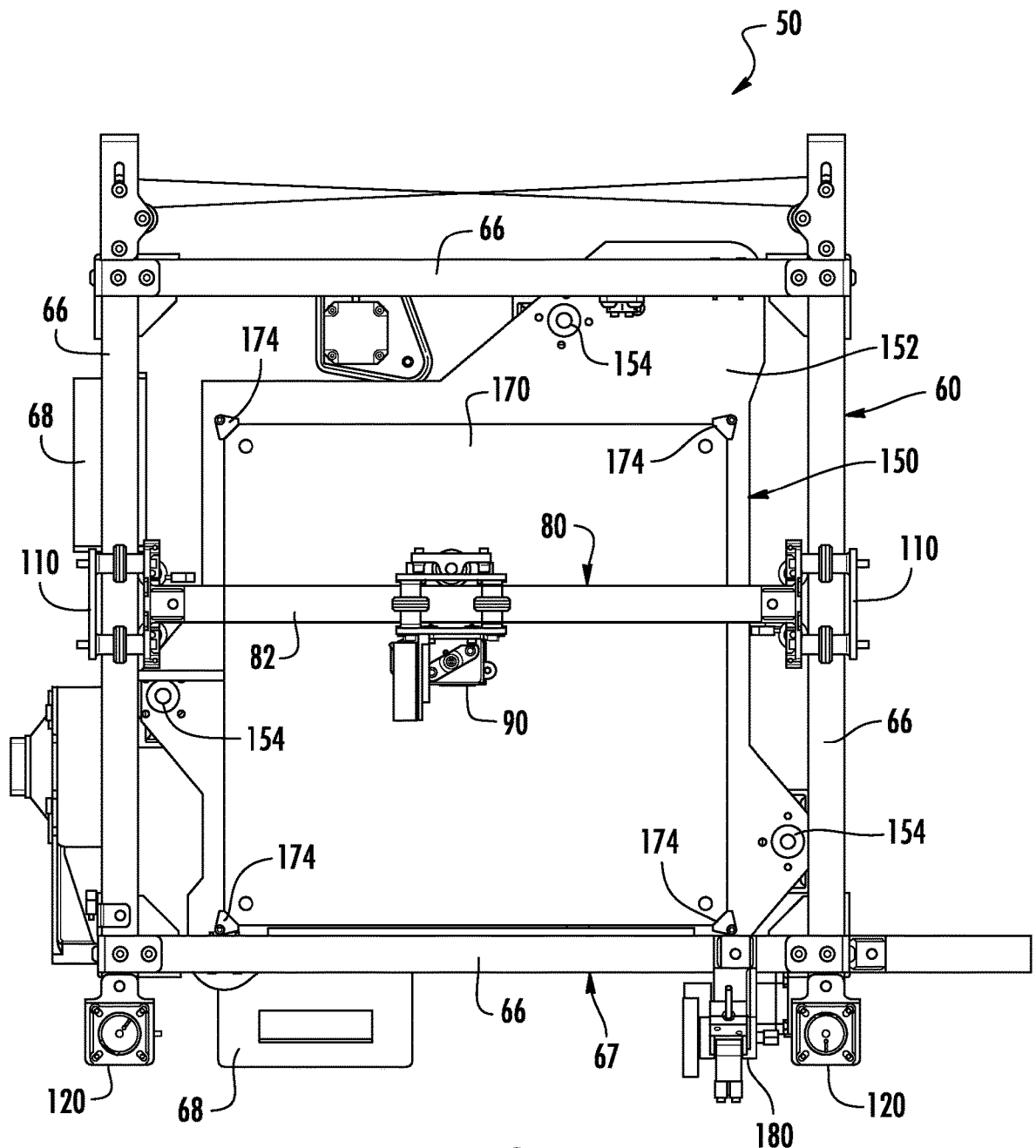
FIG. 2 is a top plan view of the apparatus for fabricating three-dimensional objects as shown in FIG. 1.
Figure 3:
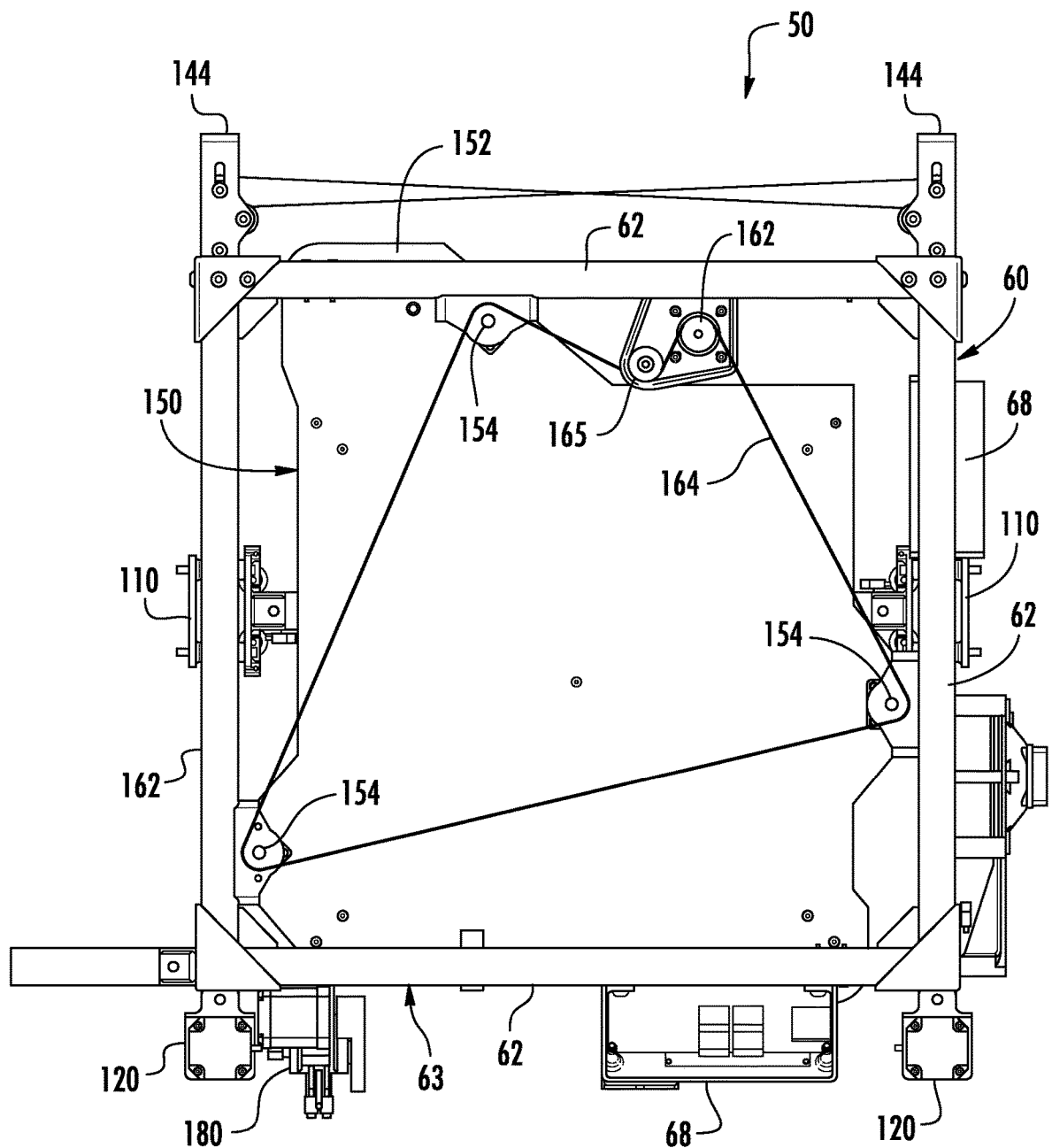
FIG. 3 is a bottom plan view of the apparatus for fabricating three-dimensional objects as shown in FIG. 1.
Figure 4:
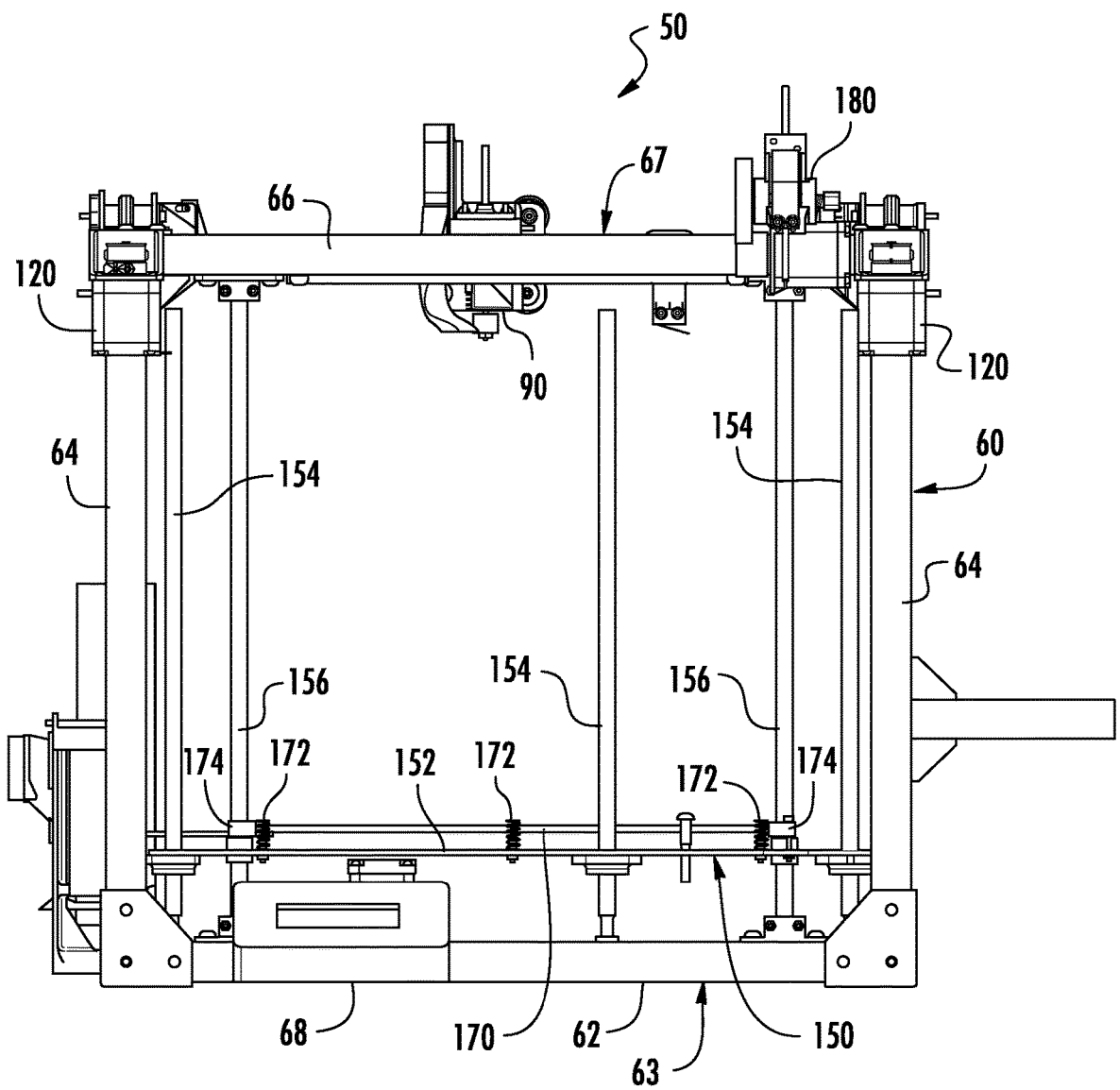
FIG. 4 is a front elevation view of the apparatus for fabricating three-dimensional objects as shown in FIG. 1.
Figure 5:
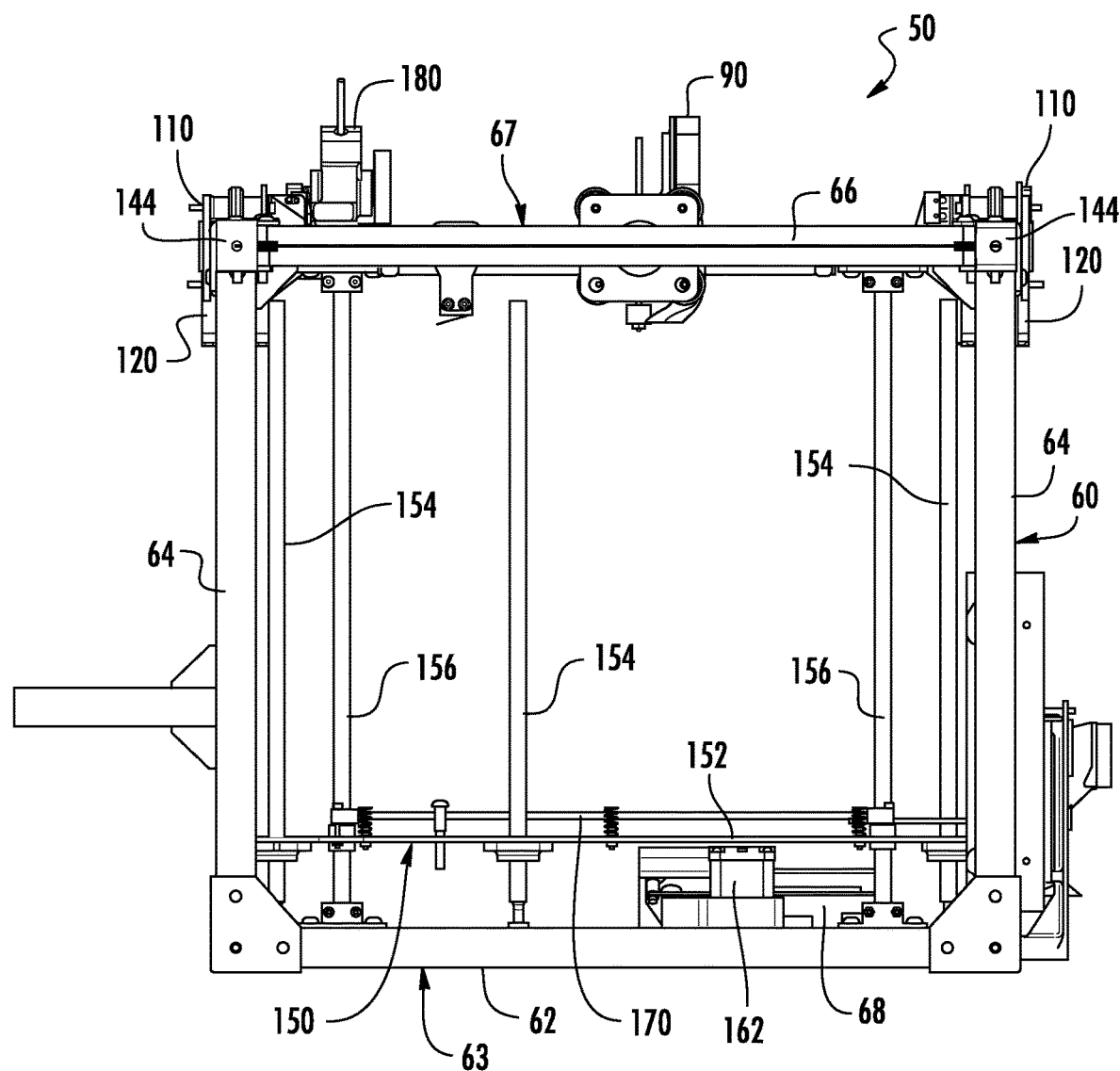
FIG. 5 is a rear elevation view of the apparatus for fabricating three-dimensional objects as shown in FIG. 1.
Figure 6:
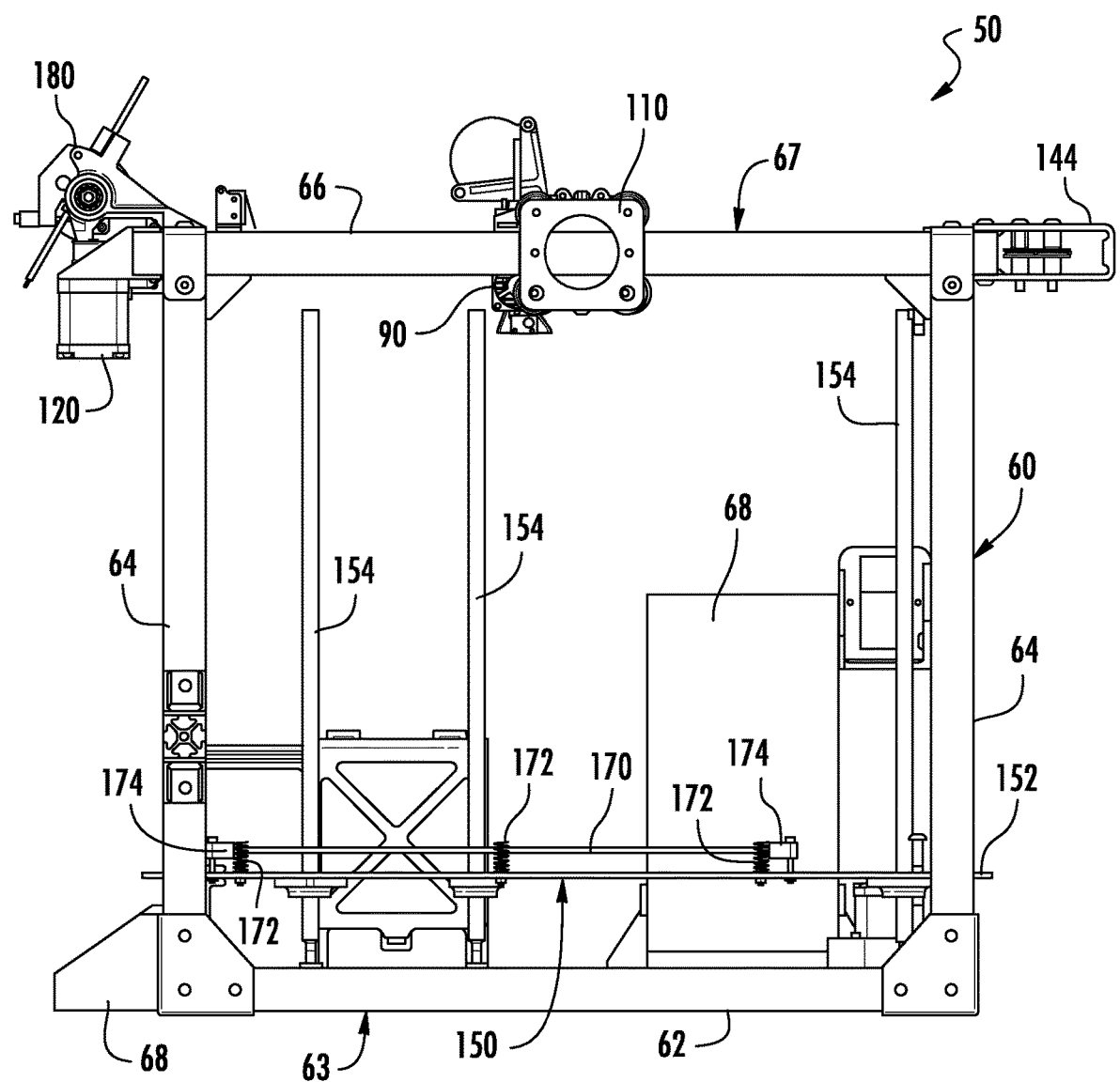
FIG. 6 is a left side elevation view of the apparatus for fabricating three-dimensional objects as shown in FIG. 1.
Figure 7:
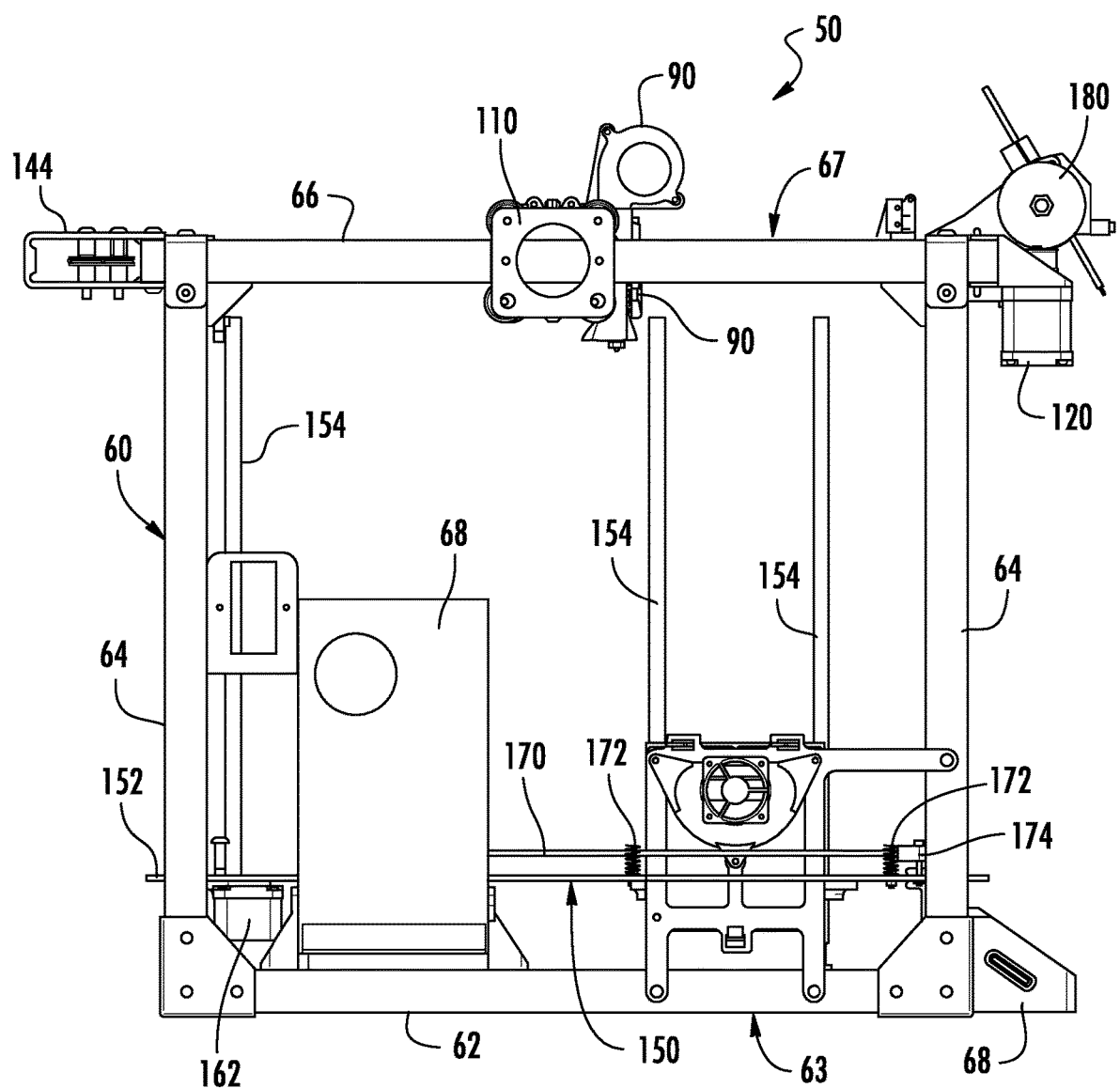
FIG. 7 is right side elevation view of the apparatus for fabricating three-dimensional objects as shown in FIG. 1.
Figure 8:
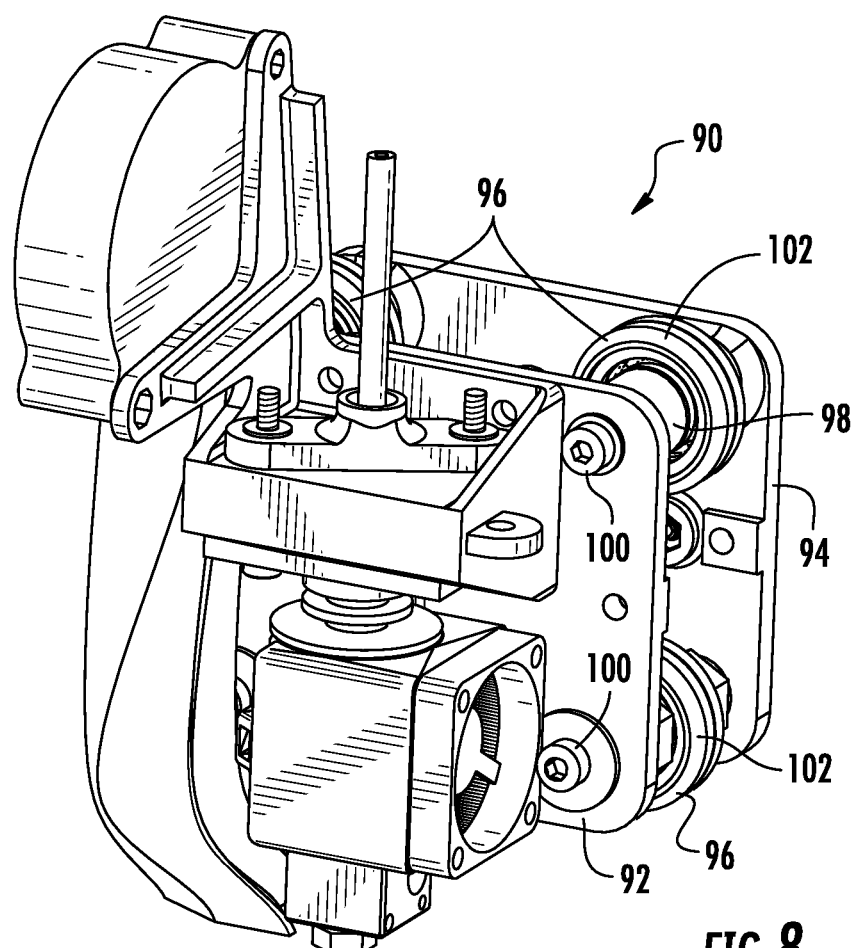
FIG. 8 is a perspective view of an embodiment of a print carriage for use with an apparatus for fabricating three-dimensional objects as shown in FIG. 1.
Figure 9:
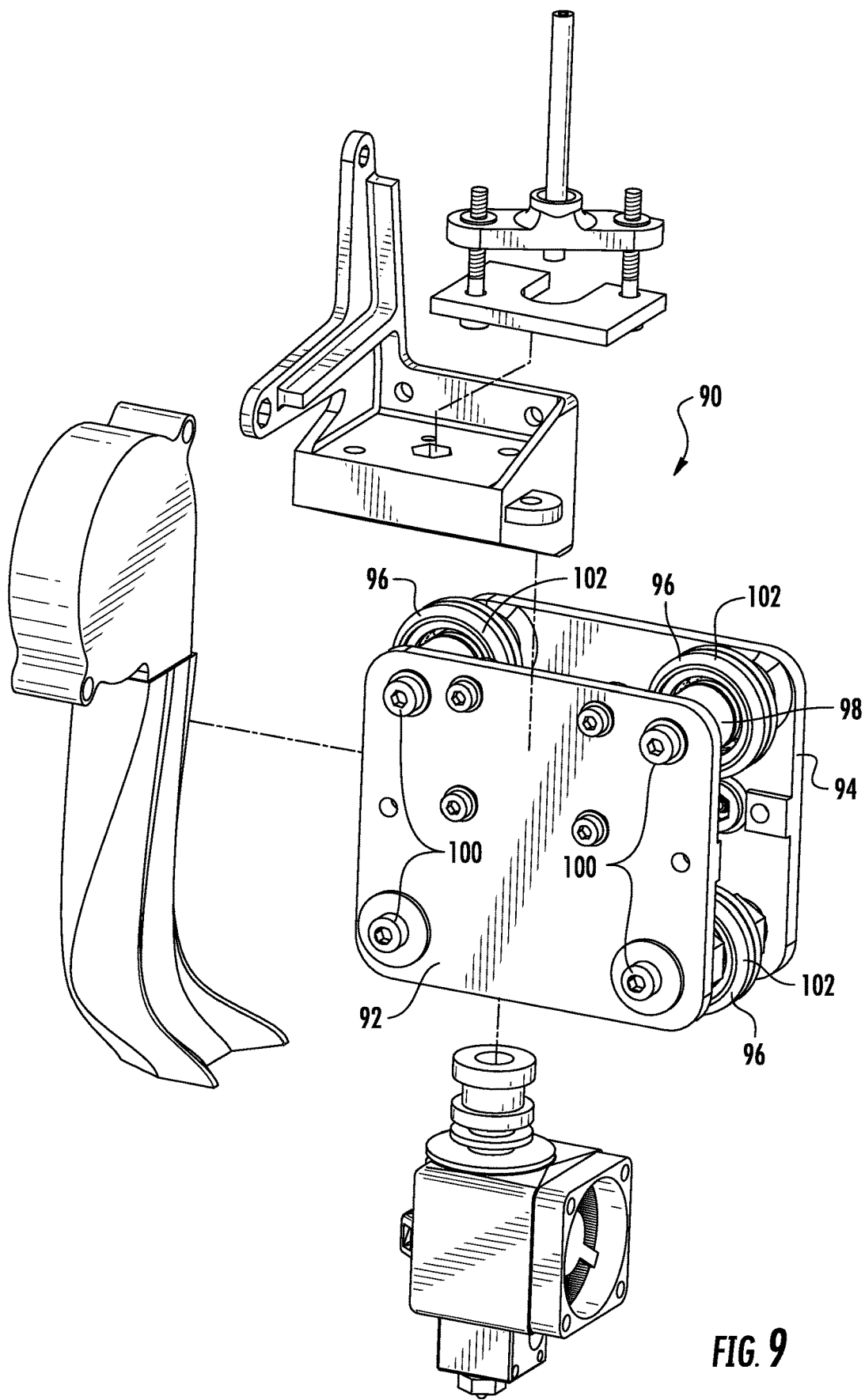
FIG. 9 is an exploded perspective view of the print carriage as shown in FIG. 1.
Figure 10:
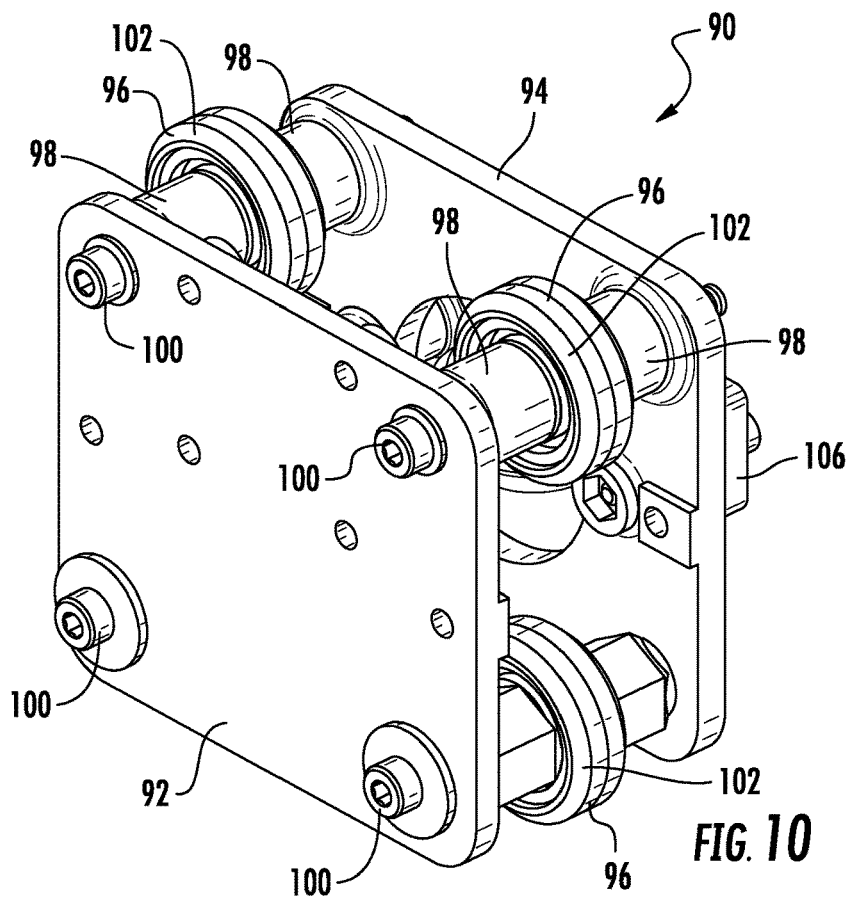
FIG. 10 is a front perspective view of the bearing assembly for use with the print carriage as shown in FIG. 10.
Figure 11:
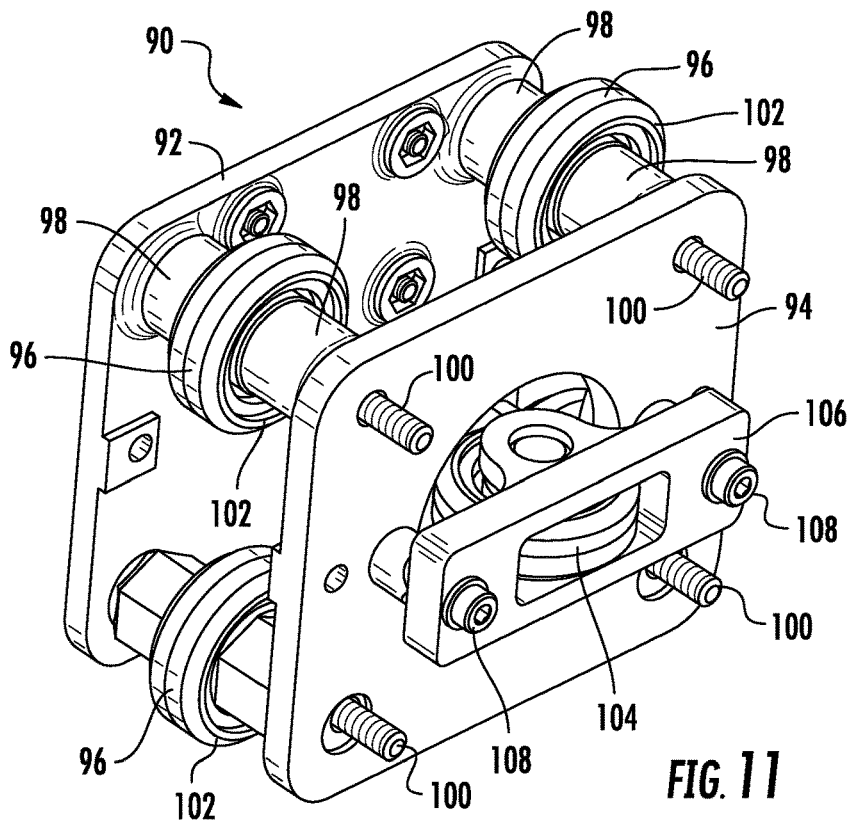
FIG. 11 is a rear perspective view of the bearing assembly for use with the print carriage as shown in FIG. 10.
Figure 12:
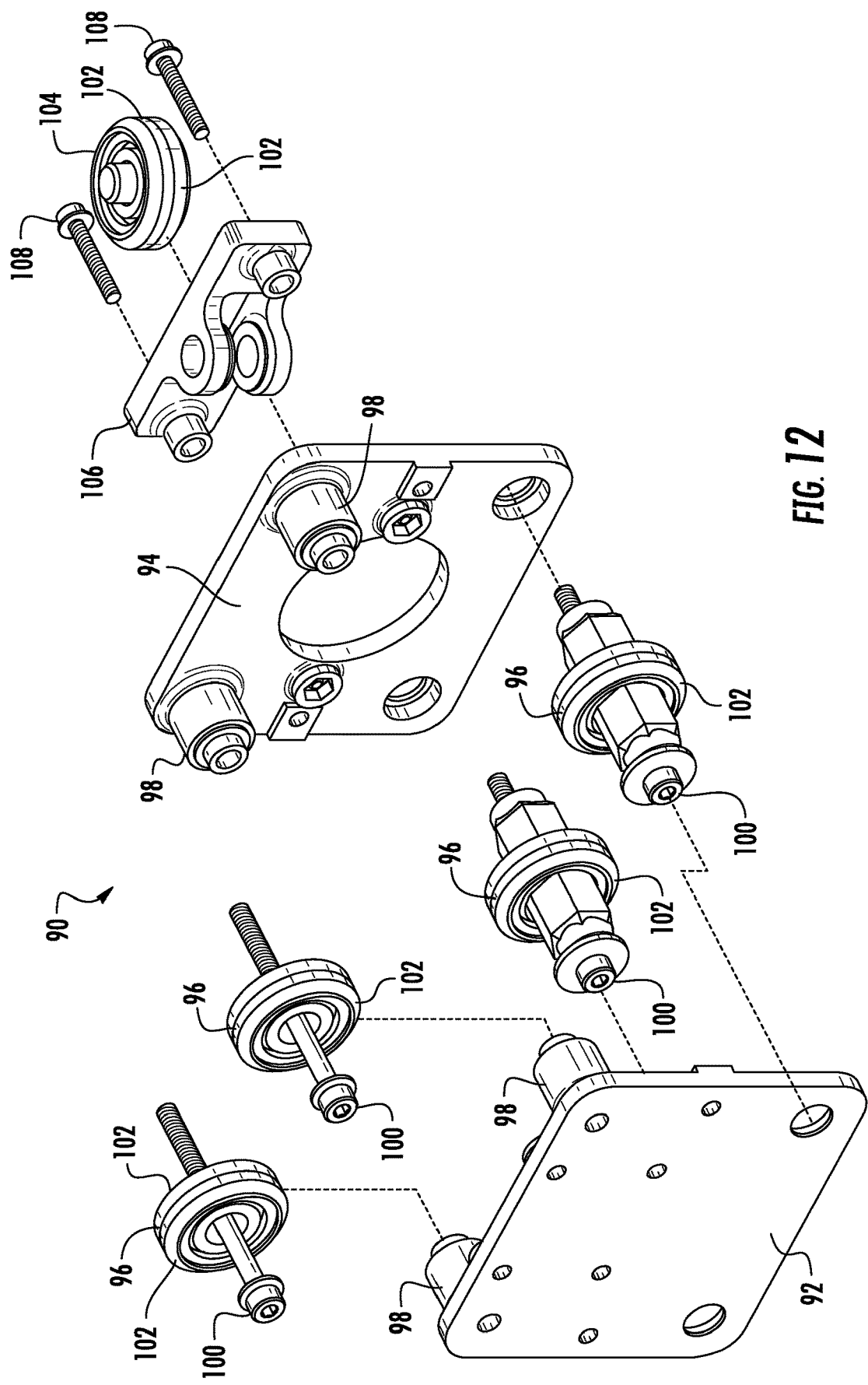
FIG. 12 is an exploded perspective view of the bearing assembly for use with the print cartridge as shown in FIG. 10.
Figure 13:
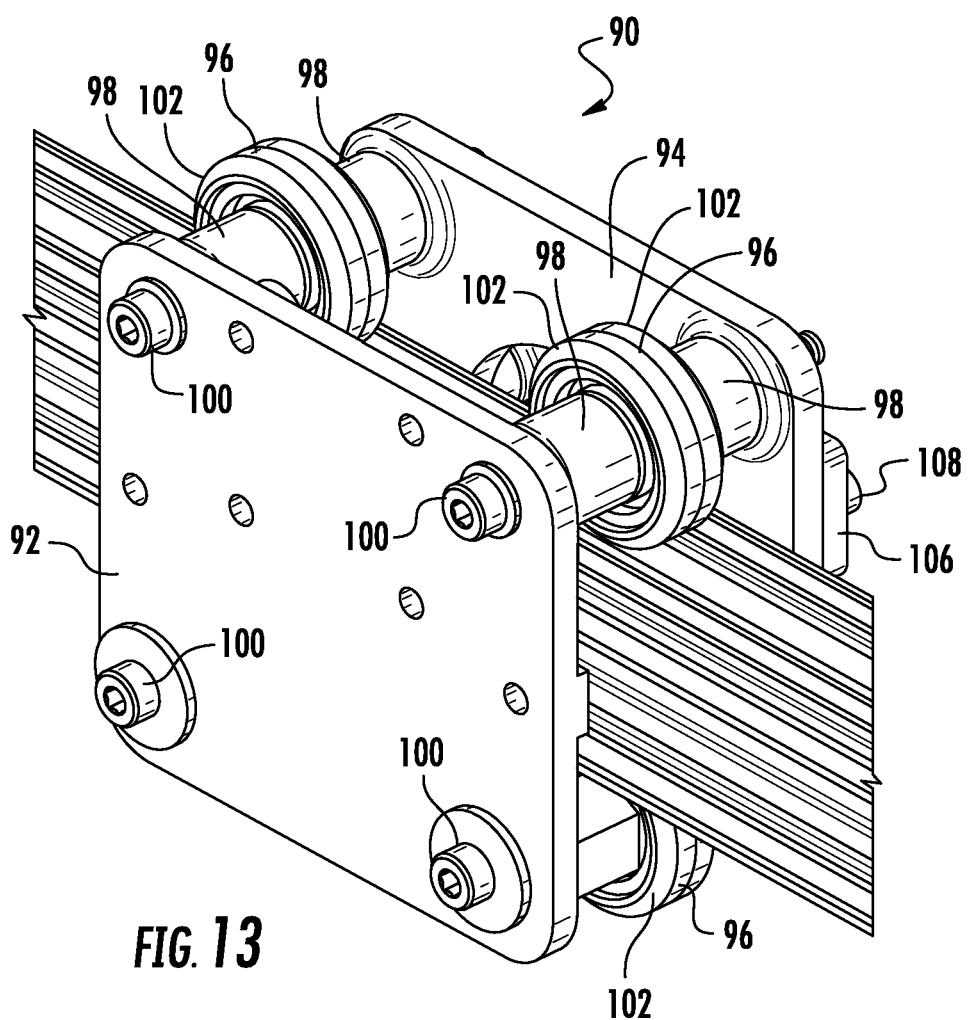
FIG. 13 is a front perspective view of the bearing assembly as shown in FIG. 10 on a guide rail.
Figure 14:
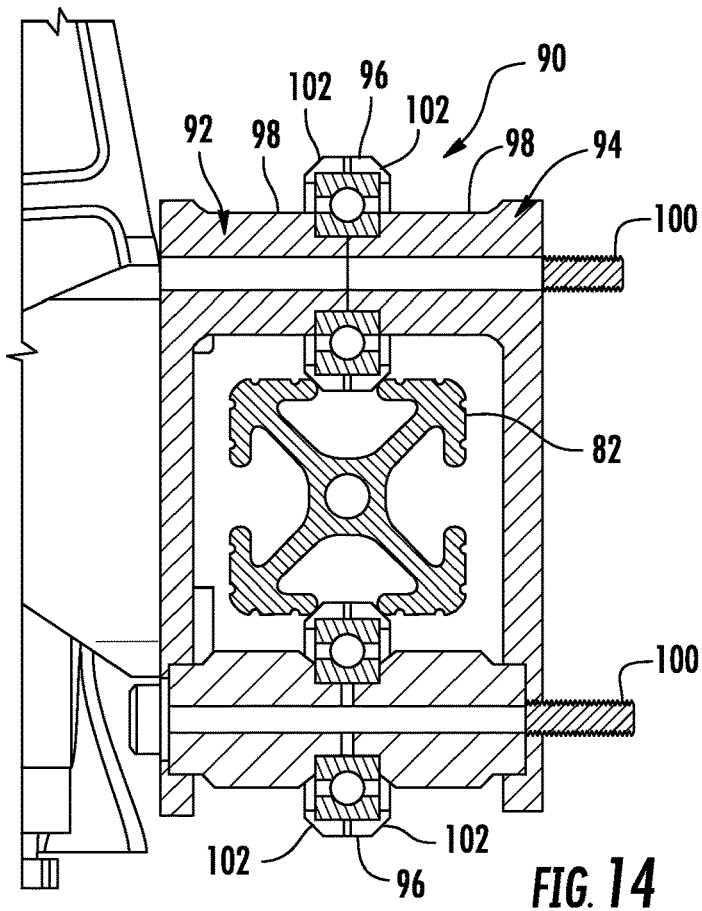
FIG. 14 is a transverse cross-section of the bearing assembly on a guide rail as taken along line 14-14 of FIG. 13.
Figure 15:
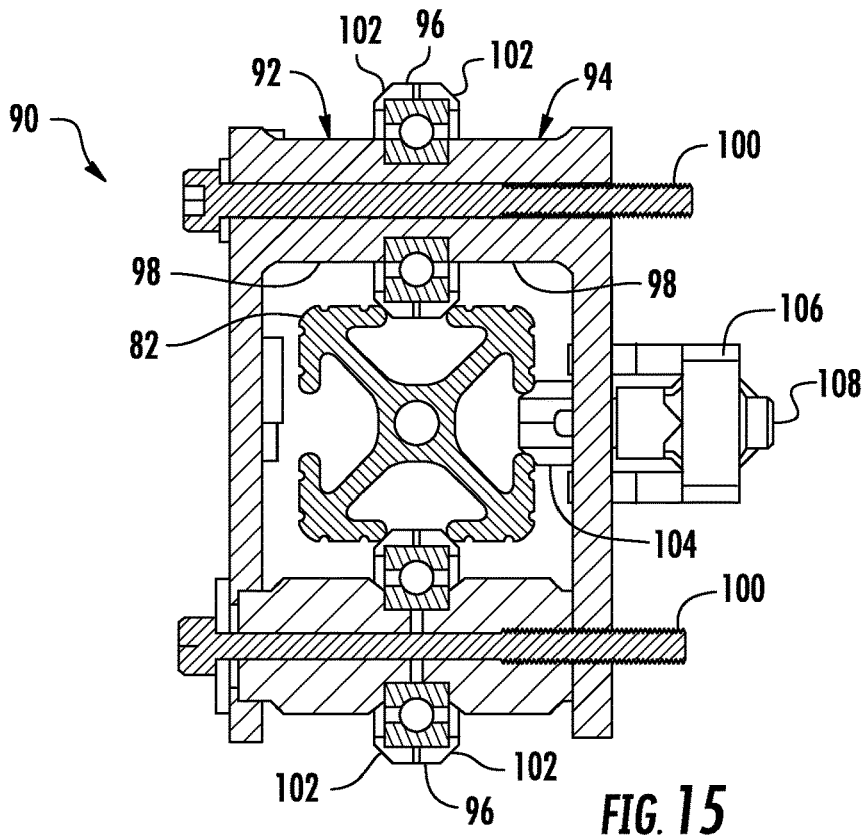
FIG. 15 is a transverse cross-section of the bearing assembly on a guide rail as taken along line 15-15 of FIG. 13.

Certain terminology is used herein for convenience only and is not to be taken as a limiting. For example, words such as "upper," "lower," "left," "right," "horizontal," "vertical," "upward," "downward," "top" and "bottom" merely describe the configurations shown in the FIGs. Indeed, the components may be oriented in any direction and the terminology, therefore, should be understood as encompassing such variations unless specified otherwise. The words "interior" and "exterior" refer to directions toward and away from, respectively, the geometric center of the core and designated parts thereof. The terminology includes the words specifically mentioned above, derivatives thereof and words of similar import.

Referring now to FIGS. 1-7, wherein like reference numerals designate corresponding or similar elements throughout the several views, an apparatus for fabricating three-dimensional objects using additive process modeling techniques is shown and generally designated at 50. The apparatus 50 comprises a frame assembly 60, a gantry assembly 80 including a print carriage 90, a print platform assembly 150, and a modeling material delivery system 180. The three-dimensional fabricating apparatus 50 builds three-dimensional objects by dispensing modeling material from the print carriage 90 onto a surface of the print platform assembly 150. The print carriage 90 is configured to receive strands of modeling material from the modeling material delivery system 180. A controller commands movement and operation of the print carriage 90 such that layers of modeling material are dispensed onto the surface of the print platform assembly 150. The print carriage 90 and the surface of the print platform assembly 150 are moved in three-dimensions relative to one another in a pattern determined by a control signal from the controller. In one embodiment, the gantry assembly 80 moves the print carriage 90 in an x,y plane as the print platform assembly 150 moves the surface in a z-direction perpendicular to the x,y plane.

The frame assembly 60 includes four lower structural members 62 connected at their ends to form a lower frame portion 63 defining a square footprint. Lower ends of vertical structural members 64 are connected to, and extend upwardly from, the corners of the lower frame portion 63.

Upper ends of the vertical support members 64 are connected to and support four upper structural members 66 connected at their ends to form an upper frame portion 67. The structural members 62, 64, 66 can be an aluminum extrusion "T-slot" profile or similar structure made from other suitable materials.

The gantry assembly 80 comprises a guide member 82 disposed between two opposed upper structural members 66. The guide member 82 is a structural member and, as with the other structural members 62, 64, 66, can be an aluminum extrusion "T-slot" profile or similar structure made from other suitable materials. The ends of the guide member 82 can be fixed to the structural members 66, or the guide member 82 can be movable relative to the frame assembly 60 such as in a 2-axis (x, y) motion arrangement as described below. The print carriage 90 rides on the guide member 82.

Referring now to FIGS. 8-15, the print carriage 90 comprises a front plate 92, a spaced parallel rear plate 94, and bearings 96 disposed between the plates. In the embodiment shown, a circular bearing 96 having an axis of rotation perpendicular to the plane of the plates 92, 94 is positioned between each of the four corners of the plates 92, 94. The bearings 96 are mounted on standoffs 98 which, in one embodiment, may be integrated into the plates 92, 94. The standoffs 98 are configured to position the bearings 96 midway between the plates 92, 94. The front plate 92, rear plate 94, and bearings 96 are held together by threaded fasteners 100 that span the plates 92, 94, passing through the centers of the bearings 96 and the standoffs 98.

The bearings 96 are enclosed in covers formed from a low-friction plastic, such as Delrin or HDPE, but other suitable materials may be used. The outer edges of the covers have an approximately 45° chamfer 102. The chamfered outer edges 102 of the bearings 96 rollingly engage the grooved lip of the guide member 82 of the gantry assembly 80. This engagement generates a self-centering effect that keeps the print carriage 90 aligned on the guide member 82 in a manner that provides precise positioning of the print carriage 90 along the guide member 82. The size of the bearings 96 relative to the guide member 82 need not be as shown in the FIGs. It is understood that smaller or larger bearings may be used, and the size of the bearing covers may be adjusted accordingly such that the bearings 96 correctly engage the guide member 82.

One or more of the bearings 96 may be mounted on an eccentric cam (FIG. 12) that can rotate independently of the plates 92, 94. Rotating the eccentric cam varies the gap between the upper bearings and the lower bearings and can thus be used to adjust the engagement of the bearings 96 on the guide member 82. When the associated fasteners 100 are tightened, the eccentric cam resists rotation and holds the adjustment ensuring that the print carriage assembly 90 maintains the correct position. It is important to note that all bearings are captured in double shear so that no bending loads are generated in the assembly.

In one embodiment, the print carriage assembly 90 includes at least one bearing 104 positioned on the rear plate 94 such that the axis of rotation of the bearing 104 is parallel to the plates 92, 94 and perpendicular to the axis of rotation of the first set of bearings 96. The bearing 104 engages the side channel of the guide member 82 in a manner identical to the other bearings 96. The bearing 104 may be mounted in a bracket 106 that is laterally adjustable with respect to the rear plate 94. The space between the bearing 104 and the plates 92, 94 may thus be adjusted using threaded fasteners 108 for establishing a lateral preload applied to the print carriage assembly 90. This is desirable to minimize play in the bearings 96.

Figure 18:
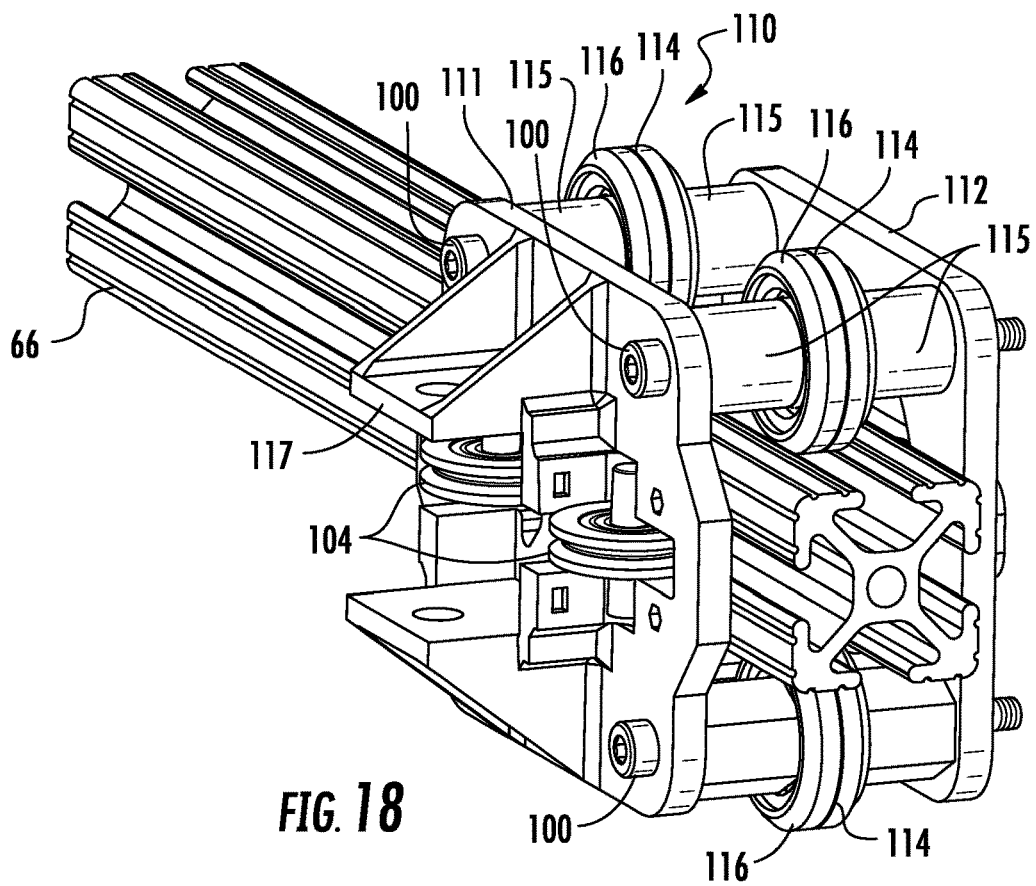
FIG. 18 is a perspective view of the bearing assembly as shown in FIG. 16 on a guide rail.
Figure 16:
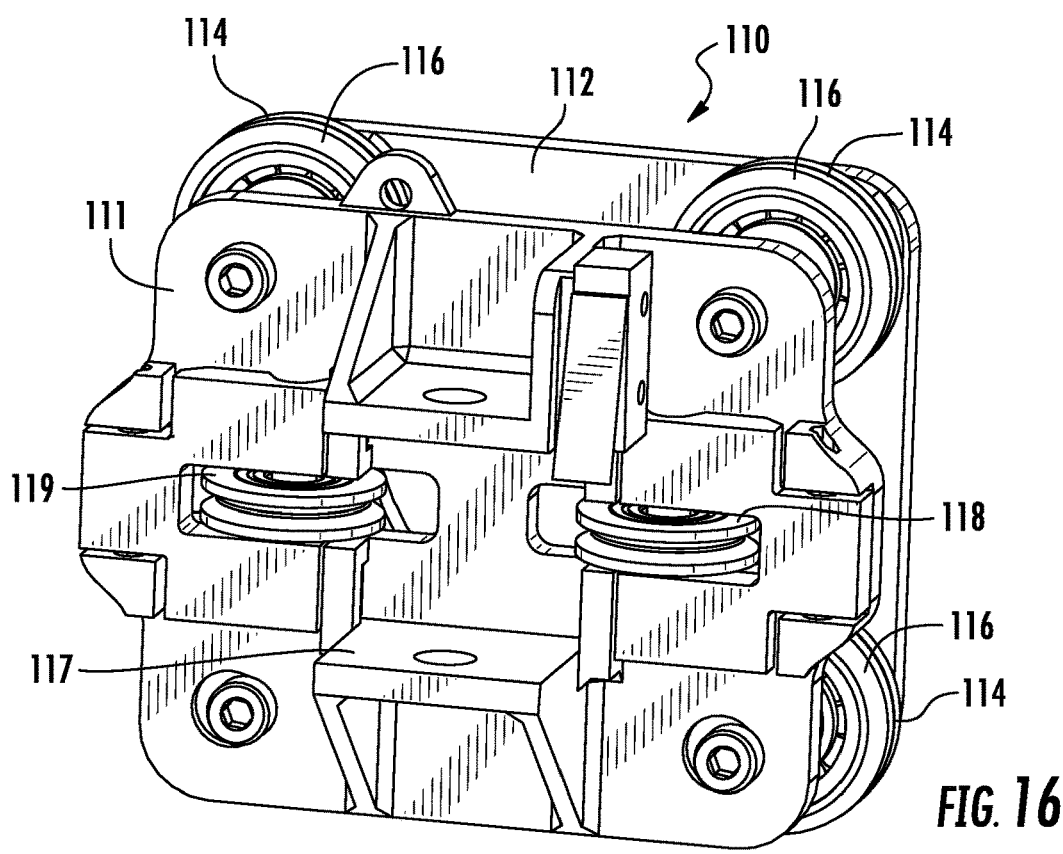
FIG. 16 is a front perspective view of a bearing assembly for use with a gantry.
Figure 17:
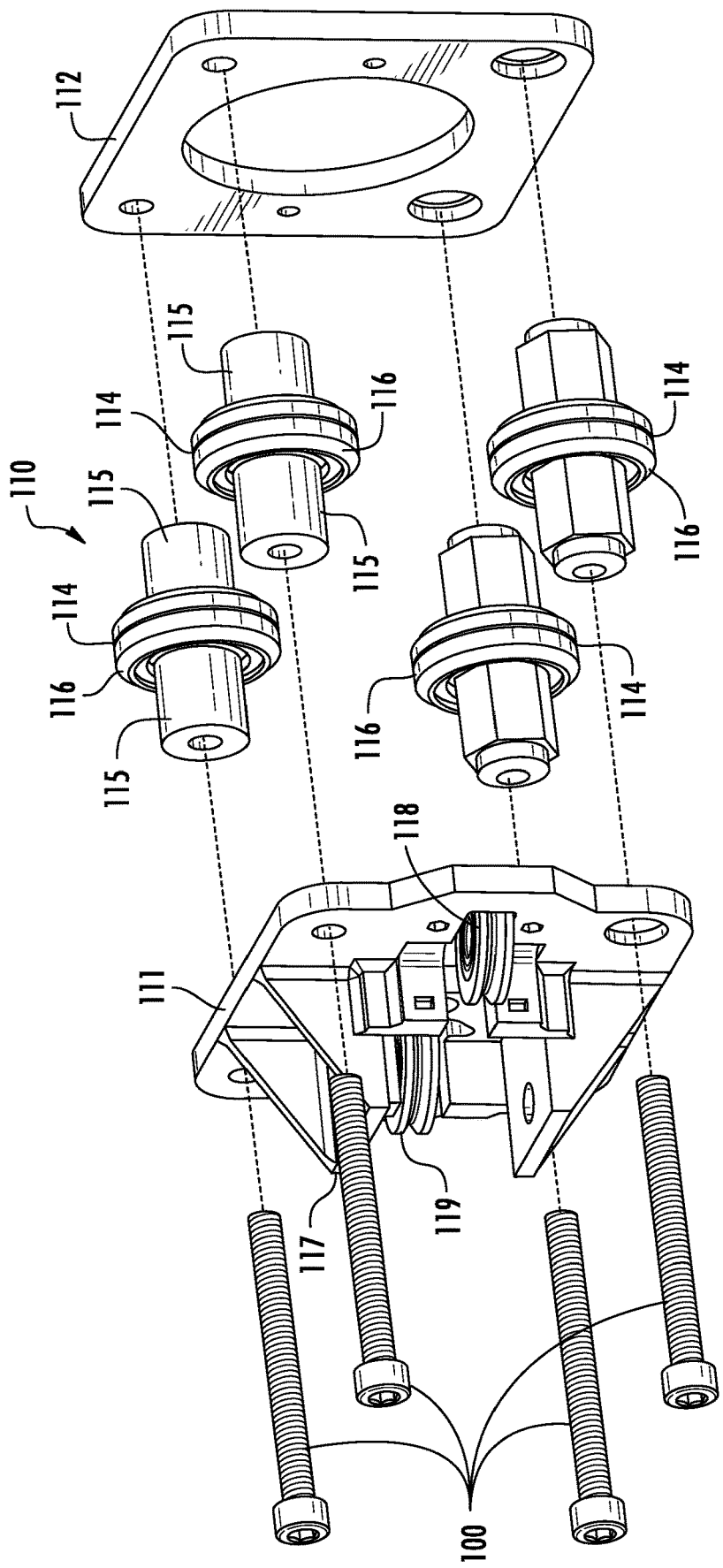
FIG. 17 is an exploded perspective view of the bearing assembly as shown in FIG. 16.

A roller carriage 110 is attached to each end of the guide member 82 of the gantry assembly 80. As shown in FIGS. 16 and 17, each roller carriage comprises a front plate 111, a spaced parallel rear plate 112, and circular bearings 114 disposed between the plates. In the embodiment shown, the bearings 114 have an axis of rotation perpendicular to the plane of the plates 111, 112 and are positioned between each of the four corners of the plates 111, 112. The bearings 114 are mounted on standoffs 115 which, in one embodiment, may be integrated into the plates 111, 112. The standoffs 115 are configured to position the bearings 114 midway between the plates 111, 112. The front plate 111, rear plate 112, and bearings 114 are held together by threaded fasteners (not shown) that span the plates 111, 112, passing through the centers of the bearings 114 and the standoffs 115. The bearings 114 are enclosed in covers formed from a low-friction plastic, such as Delrin or HDPE, but other suitable materials may be used. The outer edges 116 of the covers have an approximately 45° chamfer. Each roller carriage 110 rides an opposed parallel upper structural member 66 of the upper frame 67 (FIG. 18). The chamfered outer edges 116 of the bearings 114 rollingly engage the grooved lip of the upper structural members 66 of the upper frame portion 67. As shown in FIGS. 16 and 17, a bracket 117 is secured to the front plate 111 of the roller carriage 110. The bracket is configured such that each roller carriage 110 may be mounted to ends of the guide member 82. The upper structural members 66 function as linear motion guides for the guide member 82. The bracket carries a front pulley 118 and a rear pulley 119, as will be described below.

Figure 19:
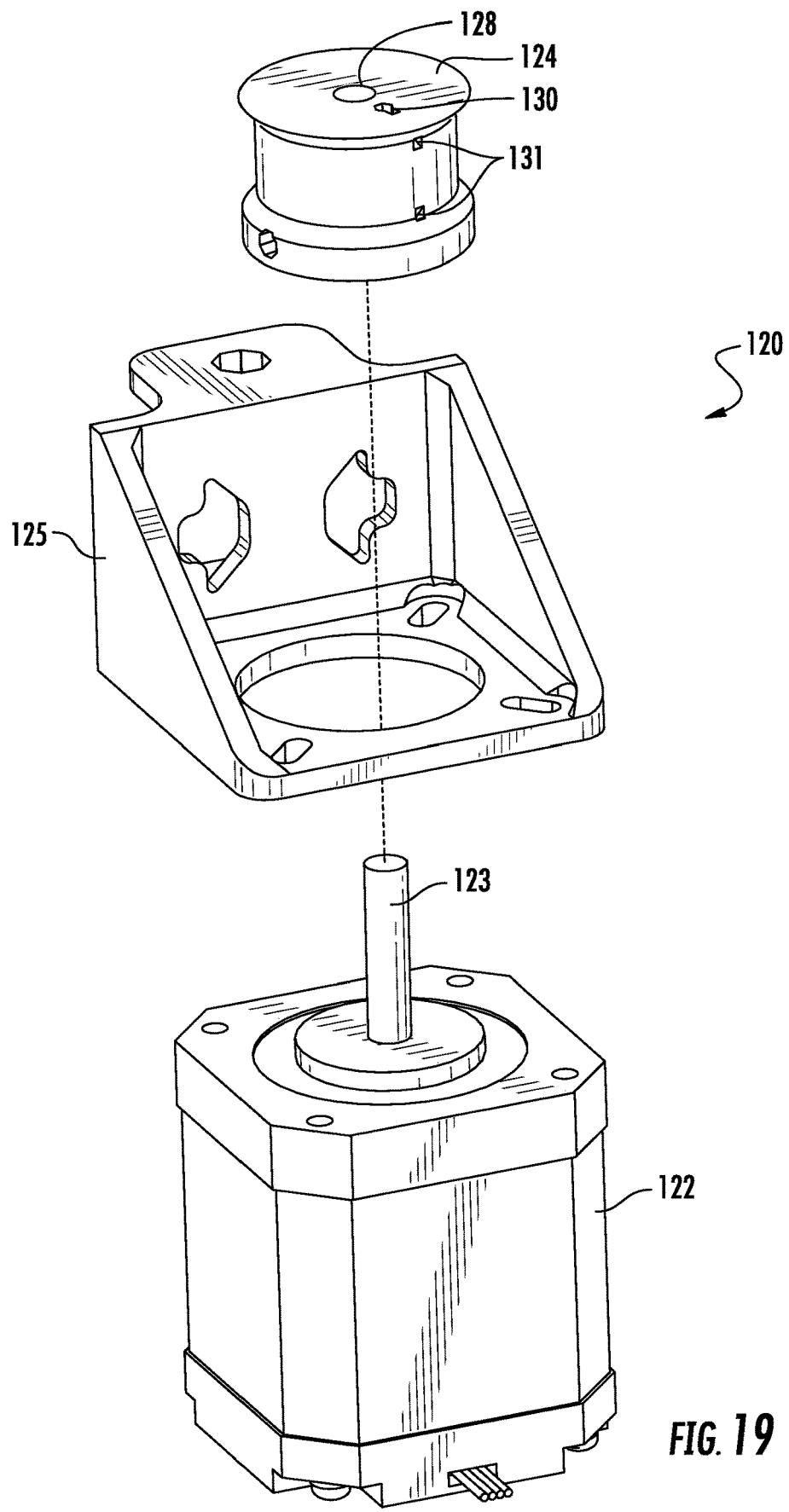
FIG. 19 is a perspective view of an embodiment of a drive mechanism for use with an apparatus for fabricating three-dimensional objects as shown in FIG. 1.
Figure 20:
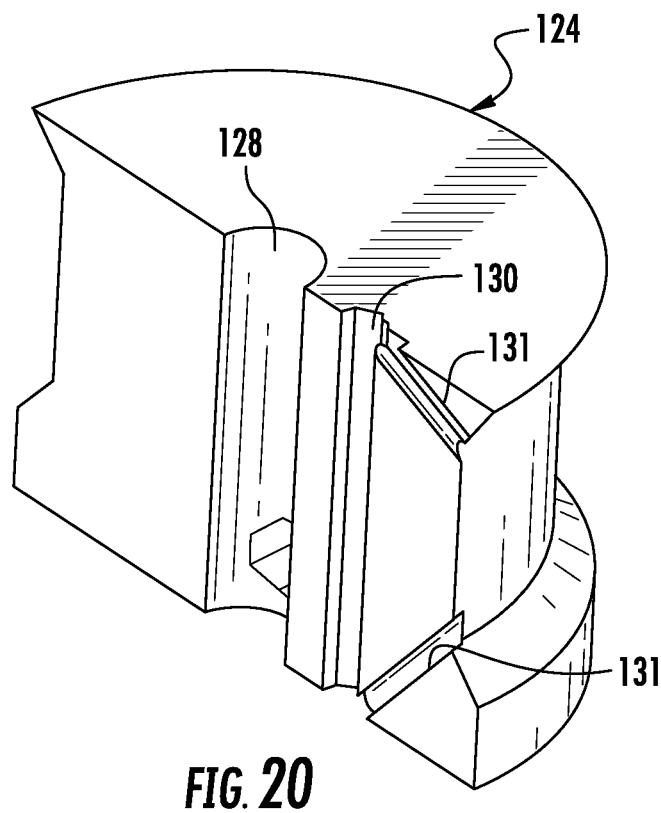
FIG. 20 is a perspective view of a longitudinal cross-section of a pulley for use with a drive mechanism as shown in FIG. 19.
Figure 21:
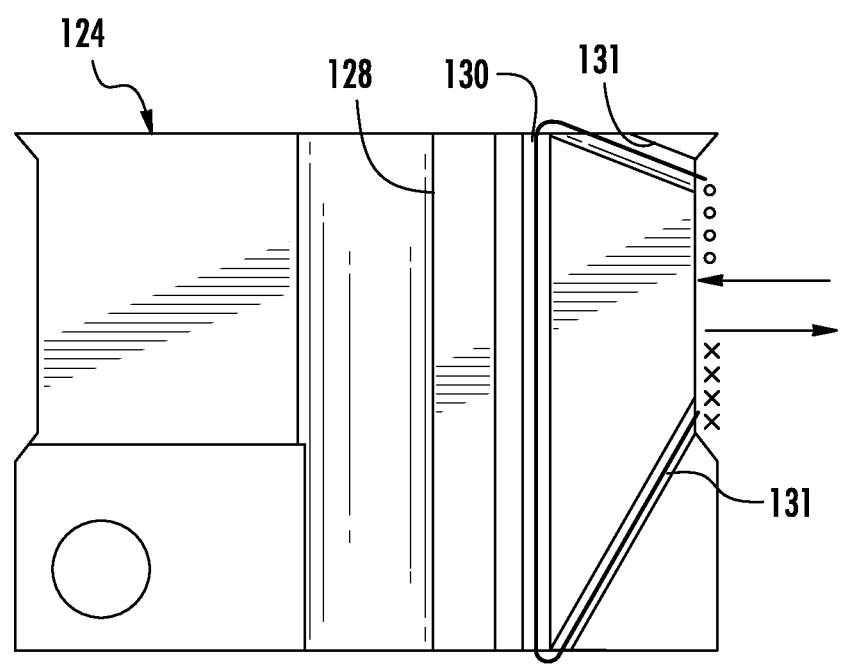
FIG. 21 is a longitudinal cross-section view of the pulley for use with a drive mechanism as shown in FIG. 20.

A drive mechanism 120 is attached to the front end of each of the linear motion guides 66 (FIG. 1). Referring to FIGS. 19-21, the drive mechanism 120 comprises a stepper motor 122, although it is understood that a closed-loop servomotor is also suitable, as is conventional. The motor 122 is suspended from a hanger 125 secured to the end of each linear motion guide 66. A cylindrical pulley 124 is mounted via a central axial passage 128 of the pulley 124 onto the output shaft 123 of each motor 122. The pulley 124 is configured for securely retaining a drive cable 126.

As shown in FIGS. 20 and 21, the drive cable 126 is wound onto the pulley 124 in a manner such that there are two separate portions of wrapped cable 126, one at the top of the pulley 124 and one at the bottom of the pulley. The drive cable 126 between the wrapped portions passes down a longitudinal hole 130 radially spaced from the central axial passage 128 of the pulley 124. The cable 126 passes outwardly to the periphery of the pulley 124 via angled passages 131 extending from the vertical hole 130. The cable 126 portion at the top of the pulley 124 is wrapped in a direction opposite to the cable 126 portion at the bottom of the pulley 124. Thus, as the pulley 124 rotates, one portion of the drive cable 126 pays off and the other portion of the cable pays onto the pulley 124 so that the total amount of cable 126 on the pulley 124 stays the same. This arrangement prevents slip between the drive cable 126 and the pulley 124. The total length of cable 126 wrapped around the pulley 124 is greater than the amount of cable needed for the guide member 82 to travel the full swept area of the apparatus. The diameter and length of the pulleys 124 are configured to accommodate this length. There are no grooves in the face of the pulley to guide the cable on and off such that the drive cable 126 is self-tailing. A suitable drive cable is formed from a high-tensile strength material, such as braided Kevlar which has very low static and dynamic stretch making the braided Kevlar an ideal application for timing belts that are commonly used in 3D printers.

Figure 22:
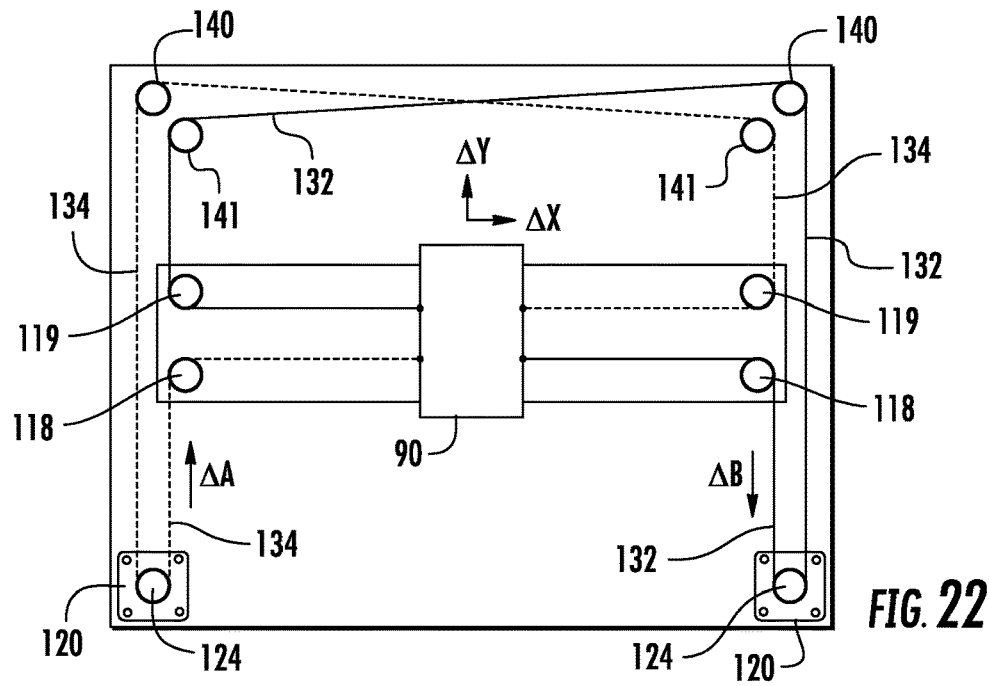
FIG. 22 is a schematic view of a cable drive system for use with an apparatus for fabricating three-dimensional objects as shown in FIG. 1.

A schematic of the drive cable route is shown in FIG. 22. Two separate cables 132, 134 are used. Each cable 132, 134 is wound around one drive pulley 124 and the ends of the cable 132, 134 are attached to the print carriage 90 diagonally opposite from one another. The drive cables 132, 134 are routed through an arrangement of idler pulleys 140 at the rear end of the linear motion guides 66. The drive cables 132, 134 are also routed through the front and rear pulleys 118, 119 on each roller carriage 110. All of the idler pulleys 140 and roller carriage pulleys 118, 119 are in the same horizontal plane as the drive pulleys 124. In one embodiment, the horizontal plane is at the mid-plane of the linear motion guides 66. In this arrangement, both motors 122 are held stationary, which reduces moving mass. The reaction forces on the pulleys at the ends of the linear motion guides 66 are balanced during all movements, which ensures there is no tendency of the guide member 82 to tilt or cock with respect to the linear motion guides 66.

Figure 23:
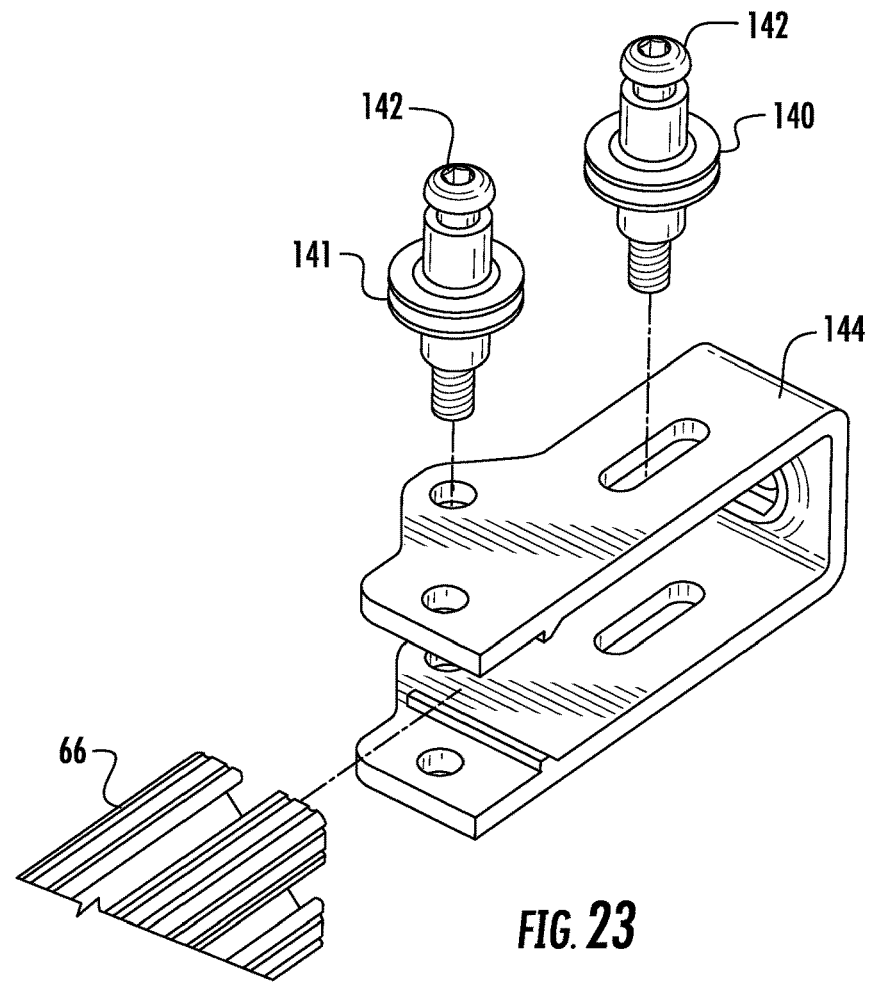
FIG. 23 is an exploded perspective view of an embodiment of an end bracket and idler pulleys in a drive mechanism for use with an apparatus for fabricating three-dimensional objects as shown in FIG. 1.

The rear idler pulleys 140 are shown in FIG. 23. The drive cable 126 tension may be adjusted using a selected one of the rear idler pulleys 140 which is mounted in a rear elongated slot of a bracket 144 with a threaded fastener 142 applying clamping force to the stack standoffs and idler pulley 140. The bolt 142 can be loosened, the position of the idler pulley 140 longitudinally adjusted to achieve the correct cable tension, and then the bolt 142 re-tightened. To adjust the "square" of the X rail with respect to the Y rails, the relative tension in the drive cables can be adjusted so that they are not equal. This method squares the frame assembly 60, which is important to ensure the tool path exactly follows the intended path.

Figure 24:
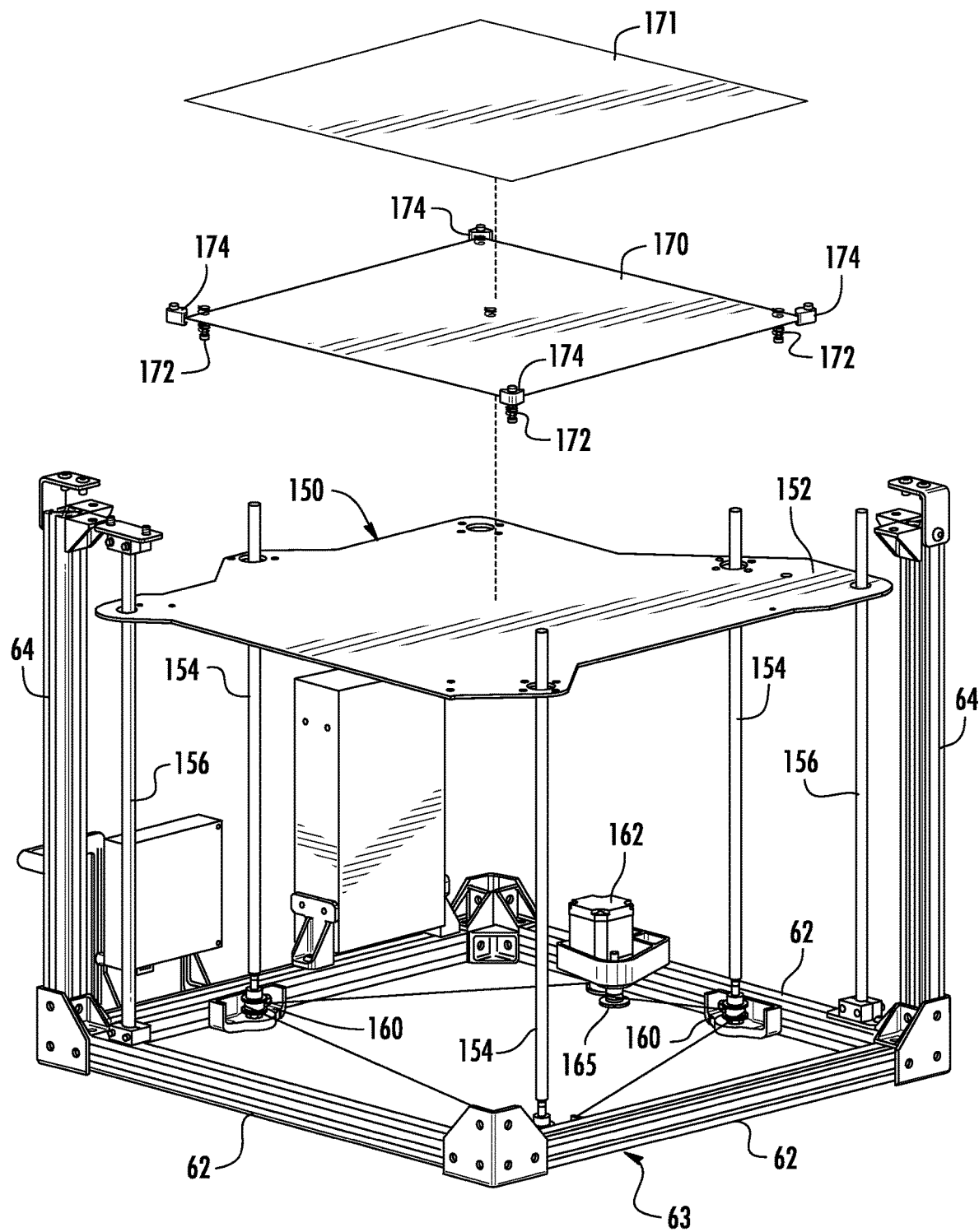
FIG. 24 is an exploded perspective view of an embodiment of a print platform assembly for use with an apparatus for fabricating three-dimensional objects as shown in FIG. 1.
Figure 25:
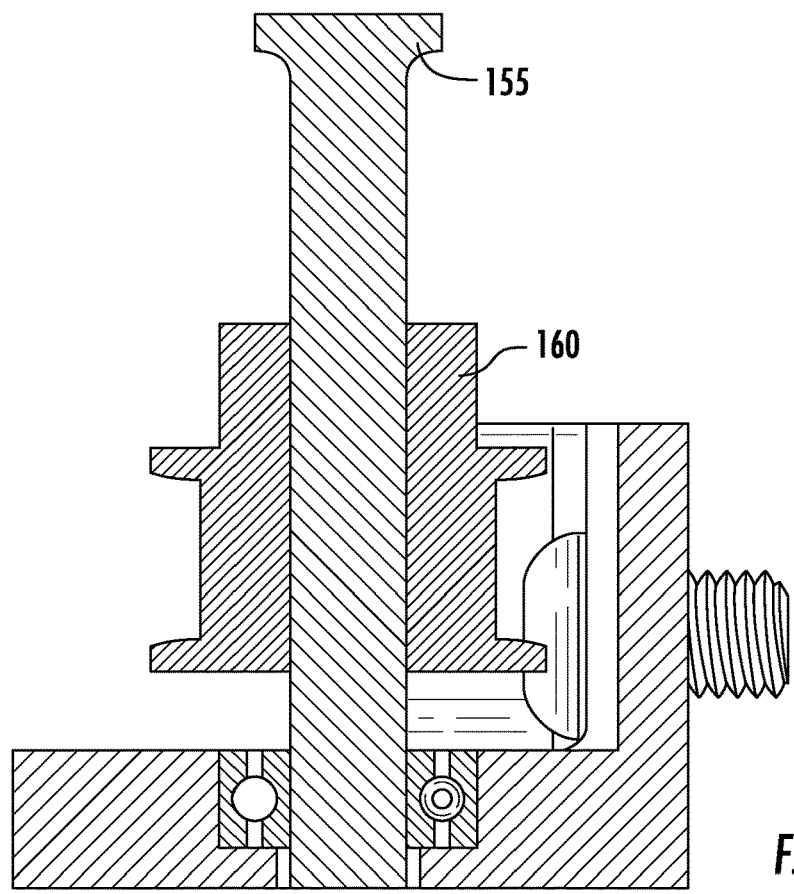
FIG. 25 is an elevation view of a pulley for a lead screw assembly for use in the print platform assembly as shown in FIG. 24.
Figure 26:
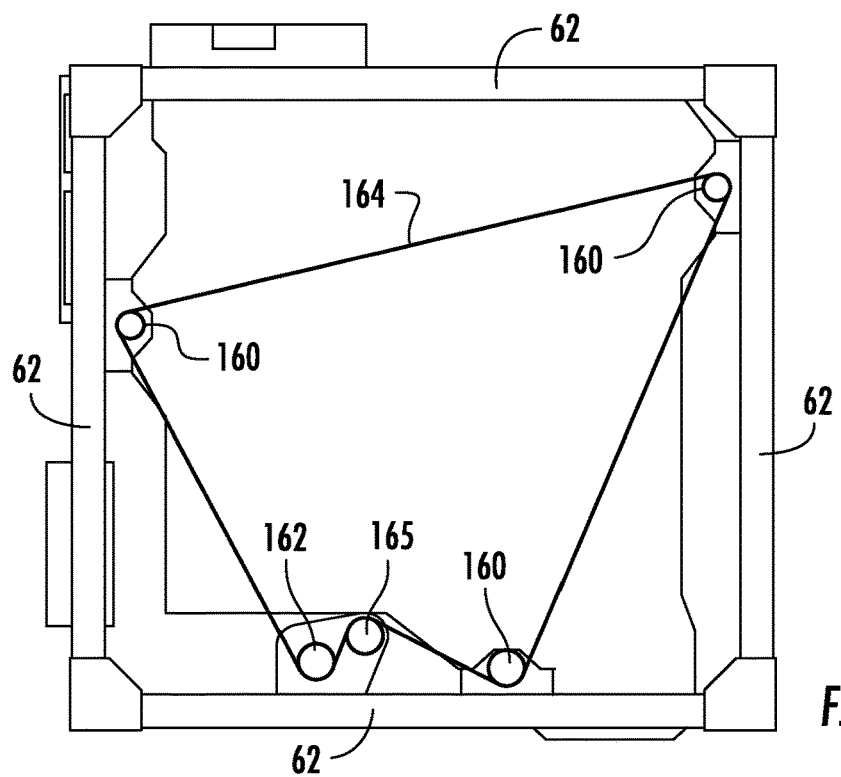
FIG. 26 is a schematic view of a cable drive system for use with a print platform assembly as shown in FIG. 24.

Referring to FIGS. 24-26, the print platform assembly 150 comprises a platen 152, which functions as a work surface, and three lead screws 154 for moving the platen 152 vertically along two smooth guide rods 156. The platen 152 is a single plate of ⅛" thick steel, although other thicknesses and other materials, such as metals, wood, or any structural material including fiberglass or carbon fiber can also be used. In one embodiment, the lead screws 154 are standard ACME threaded rod with a shoulder 155 on one end (FIG. 25). The shoulder 155 diameter matches the inside diameter of a radial bearing 158, for example, 6 mm. The top of the shoulder 155 is knurled or otherwise made to have an interference fit with the radial bearing 158 so that the bearing can be press-fit onto the lead screw 154. The bearing 158 fits into a socket 161 in a lower structural member 62 of the lower frame portion 63. A pulley 160 is installed on the shoulder 155 below the bearing 158. The tops of the lead screws are free so as not to over-constrain the system and cause binding. It is understood that other types of lead screws may be used, such as multi-start lead or ball screws.

A stepper motor or servo motor 162 is mounted to a lower structural member 62 of the lower frame portion 63 for driving a toothed timing belt 164 that engages the pulley 160 on each of the lead screws 154. In this arrangement, all three lead screws 154 are connected and turn together relative to the nuts 166 with the motor 162 drive shaft. The motor 162 can selectively drive the pulleys 160 in either a clockwise or a counterclockwise direction. The timing belt 164 synchronizes the movement of the pulleys 160, which effects synchronous rotation of the lead screws 154. As the lead screws 154 rotate, the lead nuts 166 move either up or down, causing the platen 152 to be either raised or lowered relative to the frame assembly 60, depending upon the direction of the pulley rotation.

The belt 164 is tensioned by adjusting the distance between the motor 162 and the lead screws 154. An idler pulley 165 may be added to the system as needed in order to achieve sufficient tension to the engagement between the belt 154 and the pulleys 160. In order to level the platen 152, the pulley can be loosened so that a lead screw 154 can be manually turned independently of the belt 164 and pulleys 160. Once the platen 152 is level, the pulley 160 can be tightened again so that it rotates with the lead screw 154 and provides a very stable and accurately positioned surface.

The lead screws 154 are positioned approximately equidistant from each other around the perimeter of the platen 152. However, there is flexibility in the position of the lead screws 154 thereby providing flexibility in locating other components of the 3D apparatus 50. For example, adjustability is built into the system to allow the base of the lead screws 154 to be positioned precisely under the corresponding point at which they are connected into the platen 152. It is understood that the number of lead screws may vary, and the lead screws may be positioned as needed for work surfaces of different sizes or geometries.

Engagement of the lead screws 154 with the platen 152 is via at least one threaded member built into, or attached to, the platen 152. In one embodiment, a nut 166 corresponding to the thread type and pitch of the lead screws 154 is fastened onto the surface of the platen 152. Specifically, the nuts 166 are press-fit into a carrier that is then attached to the platen 152. The nuts ride up and down on the lead screws 154 and precisely control the position of the platen 152 relative to the rotational motion of the lead screws 154. It is understood that the platen 152 could have threads created within it or other means may be used.

The pair of linear guide rods 156 are mounted firmly to lower structural members 62 on opposite sides of the lower frame portion 63 in parallel to the lead screws 154. Each guide rod 156 rides a linear recirculating ball bearing or a self-lubricating bushing fixed in the platen 152. The platen 152 is mounted to be firmly constrained with respect to lateral translation during vertical movement, but there is some small amount of angular compliance. This is preferred because the guide rods 156 exclusively position the platen 152 in the horizontal plane and are not subject to bending loads as in other vertical axis designs. Because there are no bending loads, the platen 152 is supported evenly by the lead screws 154.

The platen 152 and gantry assembly 80 are configured to move in three-dimensional space as defined by an (x, y, z) Cartesian coordinate system. Specifically, the drive system directly manipulates the gantry assembly 80 and print carriage 90 to move in the (x, y) plane based on the build data. The print platform assembly 150 is configured to move the platen 152 vertically along the lead screws 154 and guide rods 156 orthogonal to an (x, y) plane defined by the gantry assembly 80. In other embodiments, the gantry assembly 80 can be configured to translate in the vertical direction while the platen 152 remains stationary with respect to the frame assembly 60.

The print platform assembly 150 has an upper print surface 170 comprising a layer of about ⅛" standard mirror glass or other type of glass, such as standard plate glass, tempered glass, borosilicate glass, as well as plastics, metals or other suitable materials depending on the application. The print surface 170 comprises a substrate defining a planar workspace upon which three-dimensional objects are produced. The print surface 170 is stacked on top of a thin aluminum sheet 171, typically about 0.040" thick. Other materials and thicknesses can also be used in other applications. A multi-zone heater (not shown) is attached to the bottom surface of the aluminum sheet. The heater may be a kapton film or silicone mat resistance heater. The multi-zone heater is designed so that the entire surface of the glass is at a uniform temperature. Multiple zones are needed because the heat loss is greater around the edges vs. the center, so in order to have the same temperature more power must be fed to the zones heating the areas closer to the perimeter of the print bed. In the preferred embodiment, a ratio of 2:1 power distribution is used to achieve even heating. Note that tailored temperature profiles are feasible for special applications. Optionally, insulation may be added below the heater to limit heat loss.

The print surface 170 is mounted on an array of small compression springs 172, or other compliance members, disposed at each corner of the print surface 170, and optionally, one at the center. The springs 172 are attached to the platen 152 by mechanical means. The corners of the print surface 170 are captured in small clips 174 that fit over a top edge and on each corner of the print surface 170. A bolt 176 passes through each corner clip 174 and threads into the platen 152 via a PEM insert installed in the bottom of the platen, a threaded hole, a captured nut, or other means. This arrangement allows the height of the print surface 170 at each corner to be adjusted by simply turning the bolt 176. To level the print surface 170 with respect to the print head or other tool, the print head is positioned over each corner of the print surface 170 and the gap between the tip of the print head and the print surface 170 is adjusted so that it is the same at each corner. Typically this may be done with a feeler gauge, the thickness of which is selected to achieve the correct gap.

Figure 27:
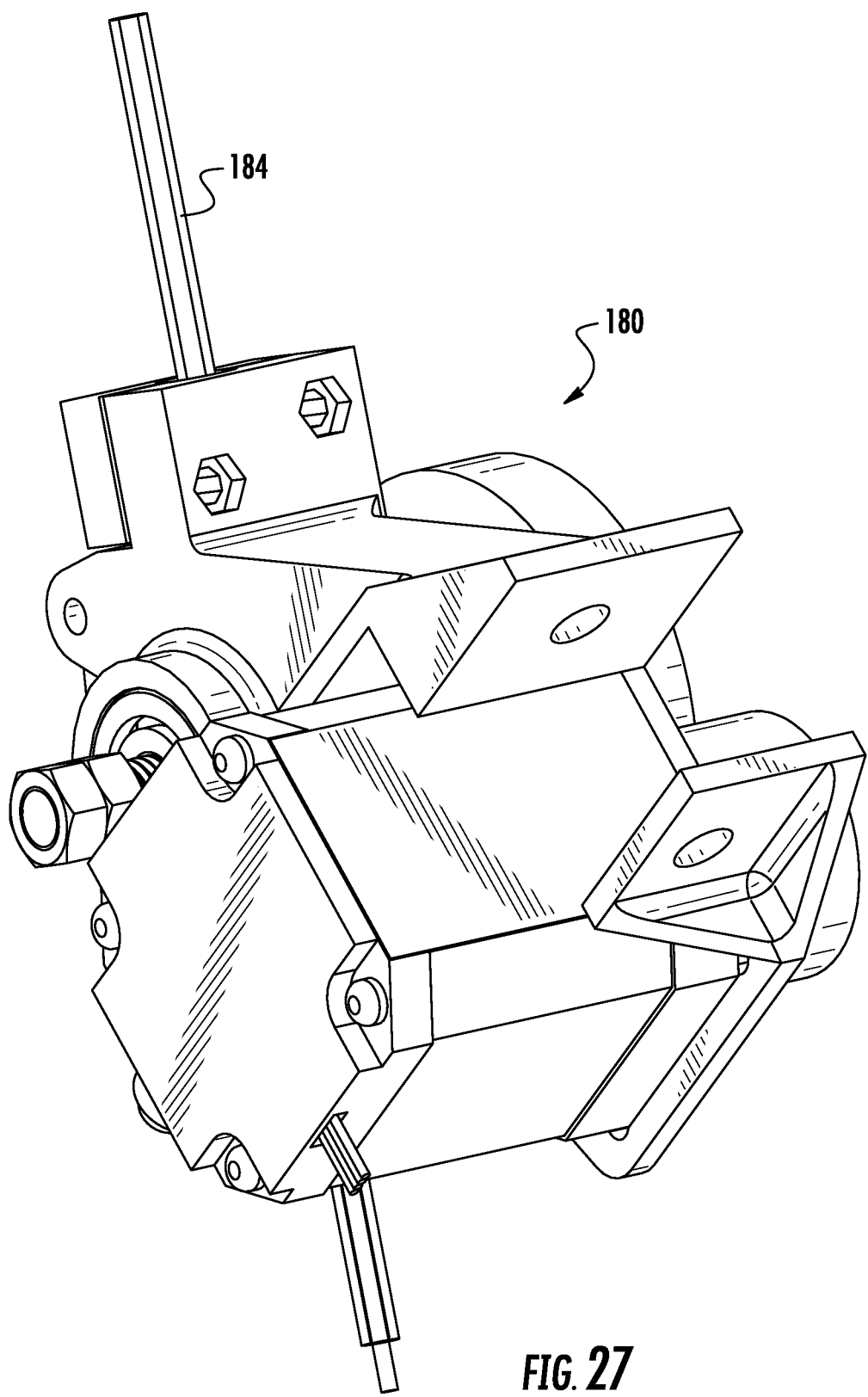
FIG. 27 is a perspective view of an embodiment of a material delivery assembly for use with an apparatus for fabricating three-dimensional objects as shown in FIG. 1.
Figure 28:
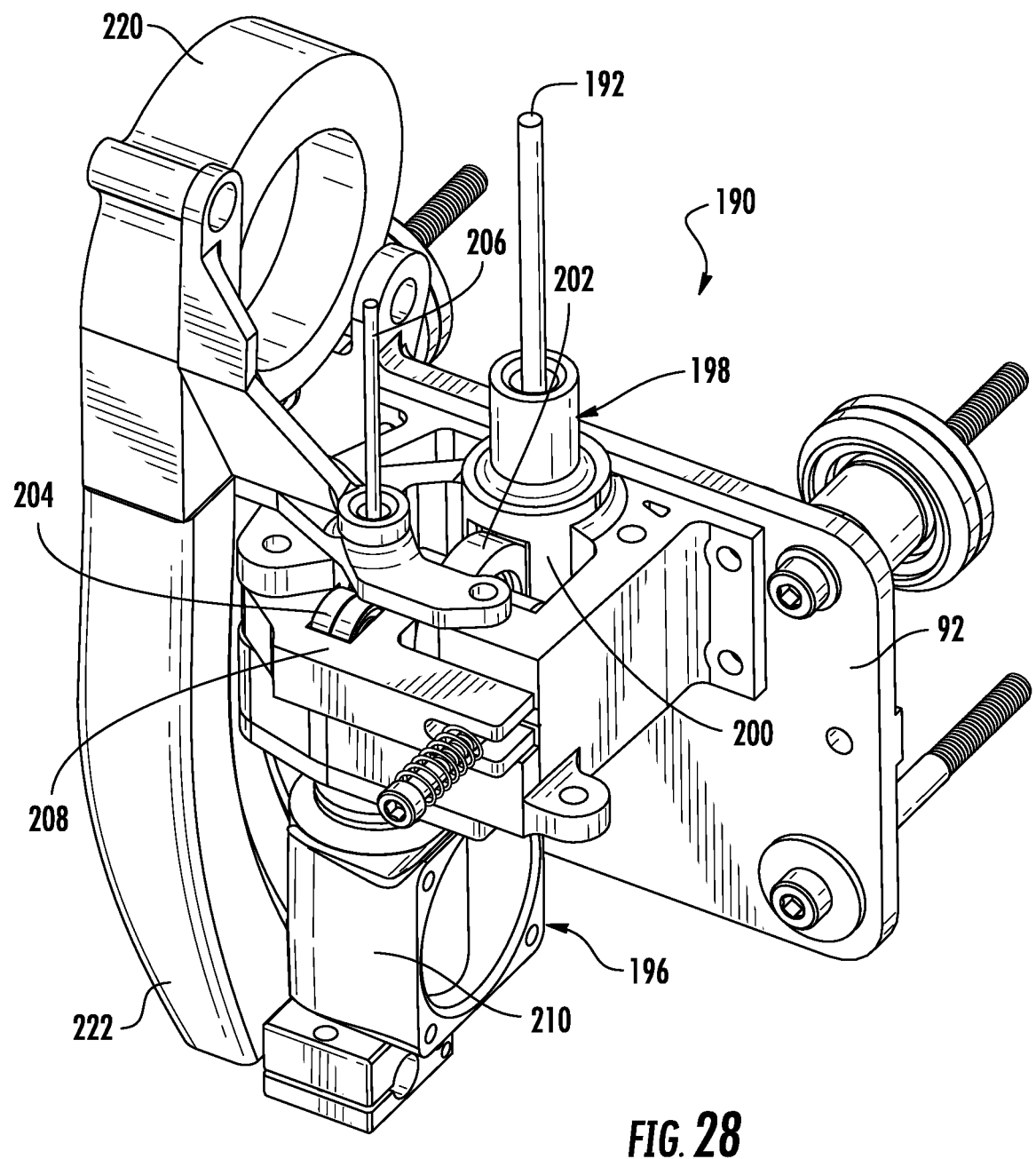
FIG. 28 is a perspective view of an embodiment of a print cartridge assembly for use with an apparatus for fabricating three-dimensional objects as shown in FIG. 1.
Figure 28A:
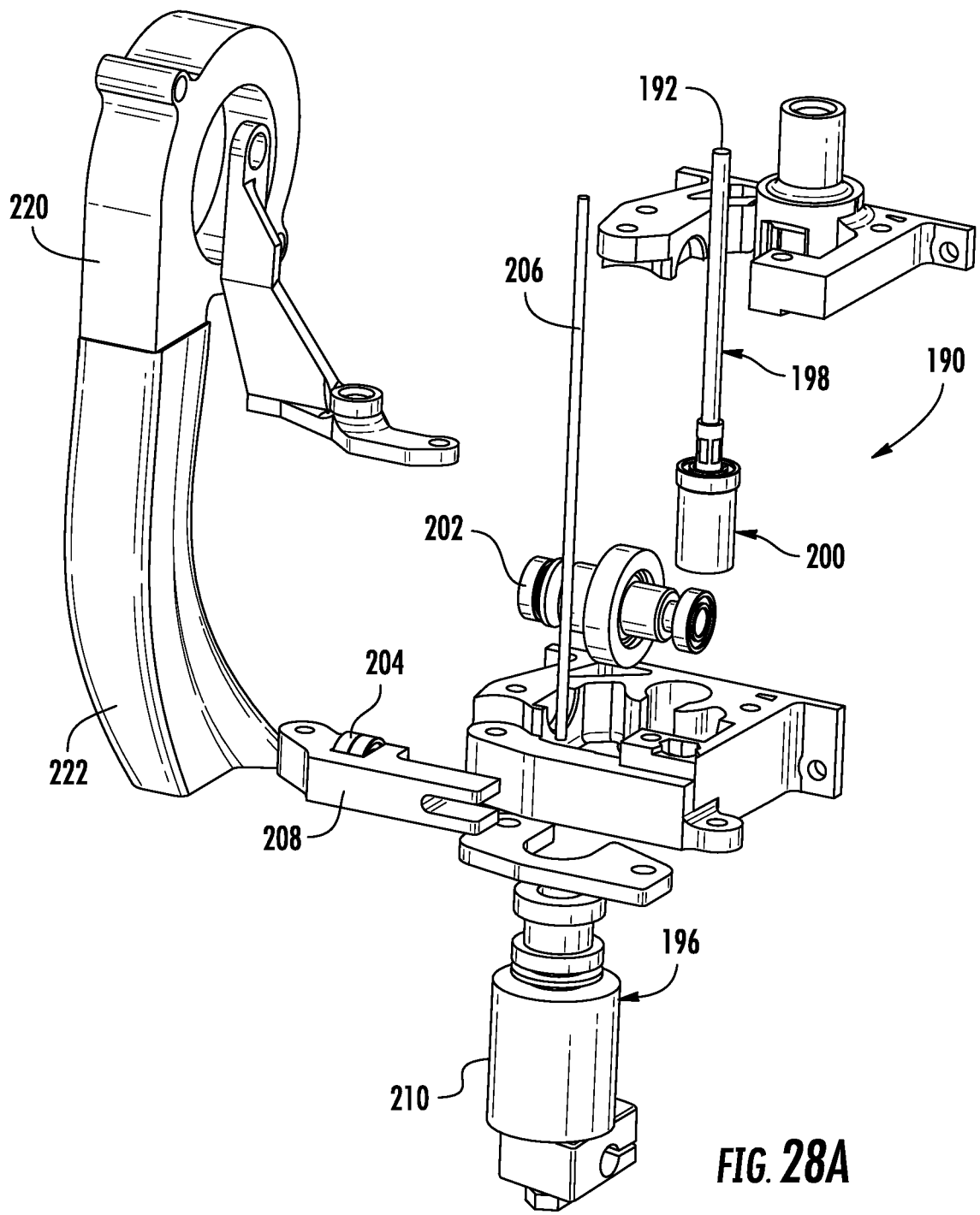
FIG. 28A is an exploded perspective view of a print cartridge assembly as shown in FIG. 28.
Figure 29:
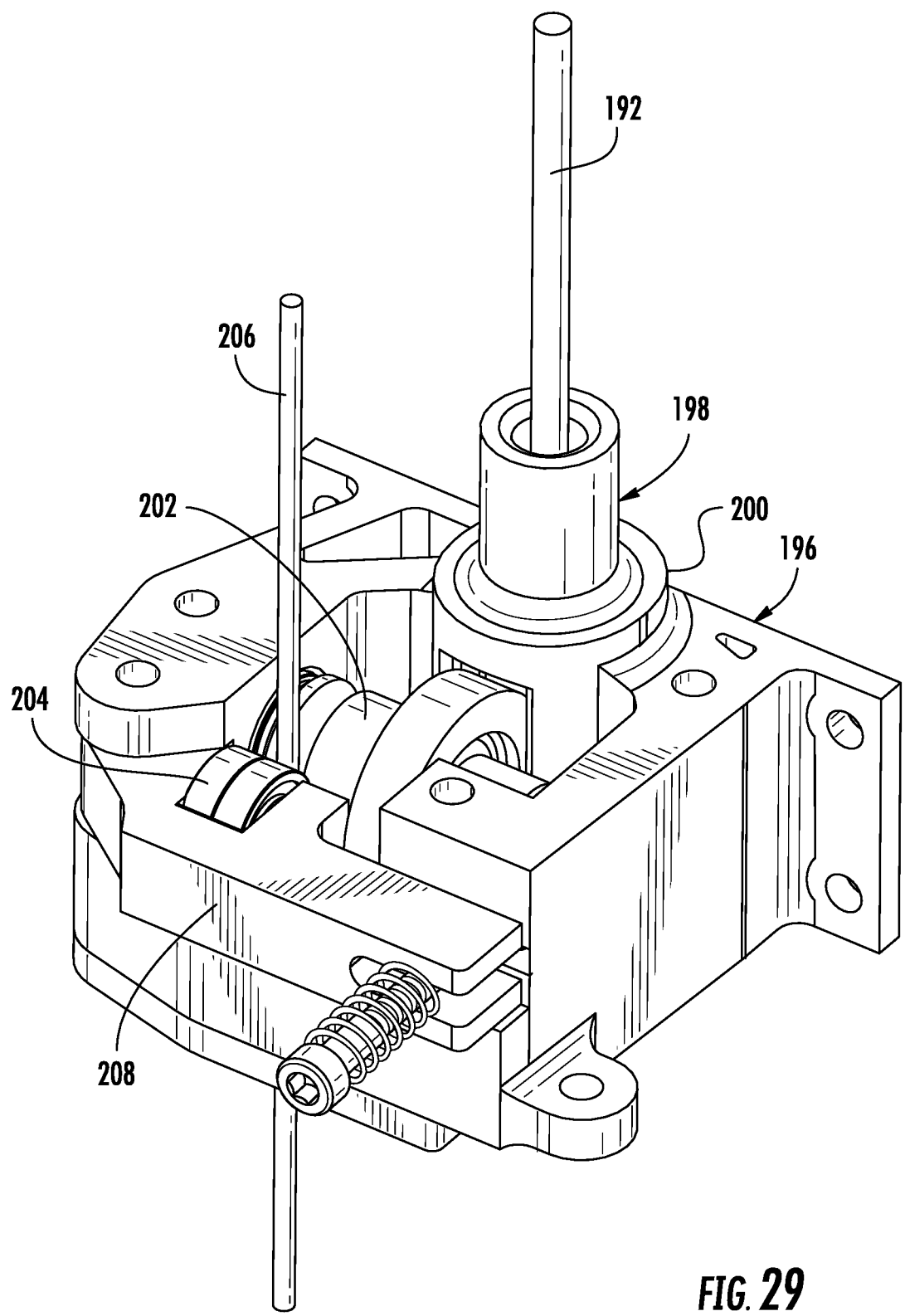
FIG. 29 is a perspective view of a portion of the print cartridge assembly as shown in FIG. 28.
Figure 30:
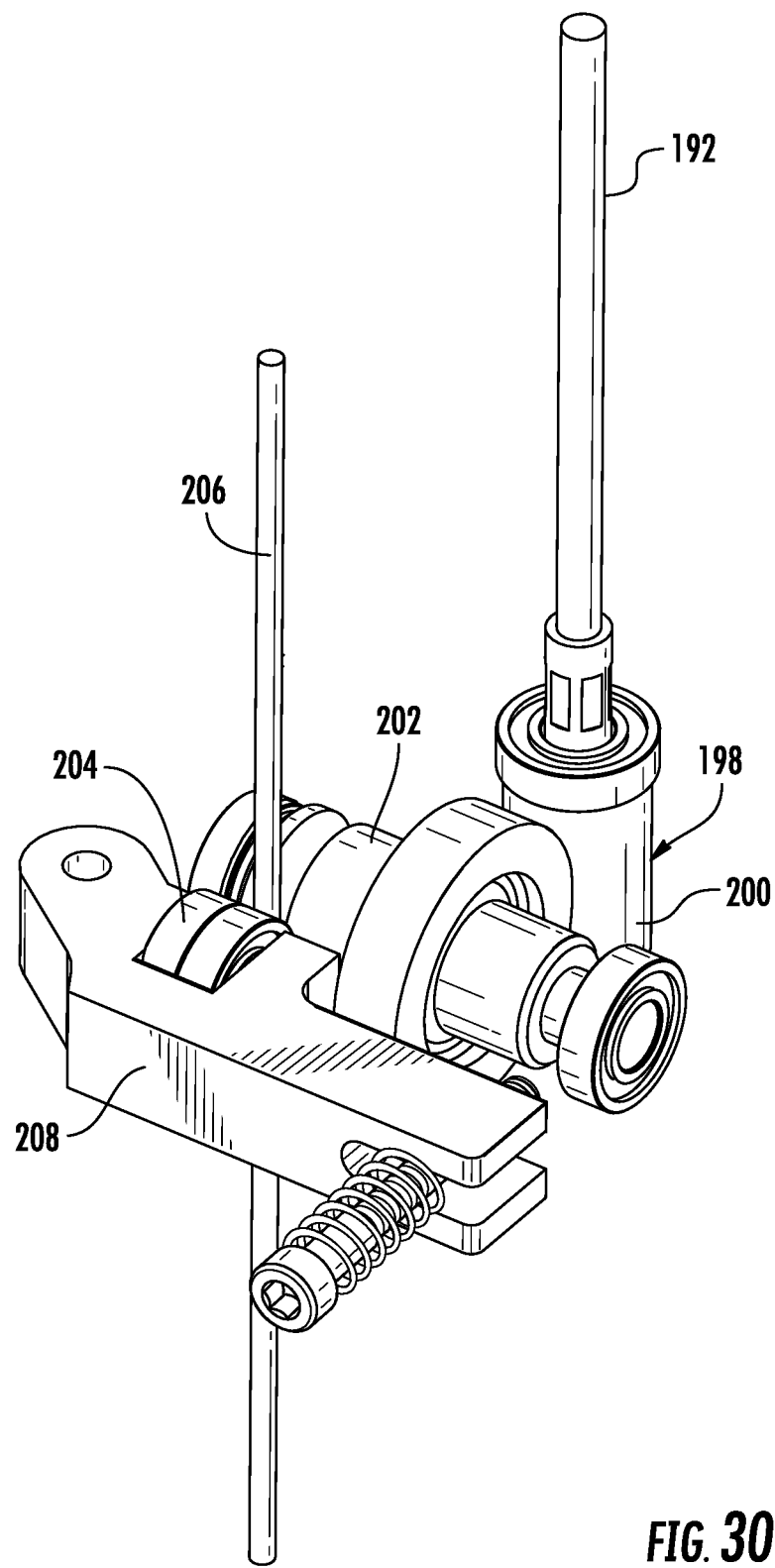
FIG. 30 is a perspective view of a portion of the print cartridge assembly as shown in FIG. 29.
Figure 31:
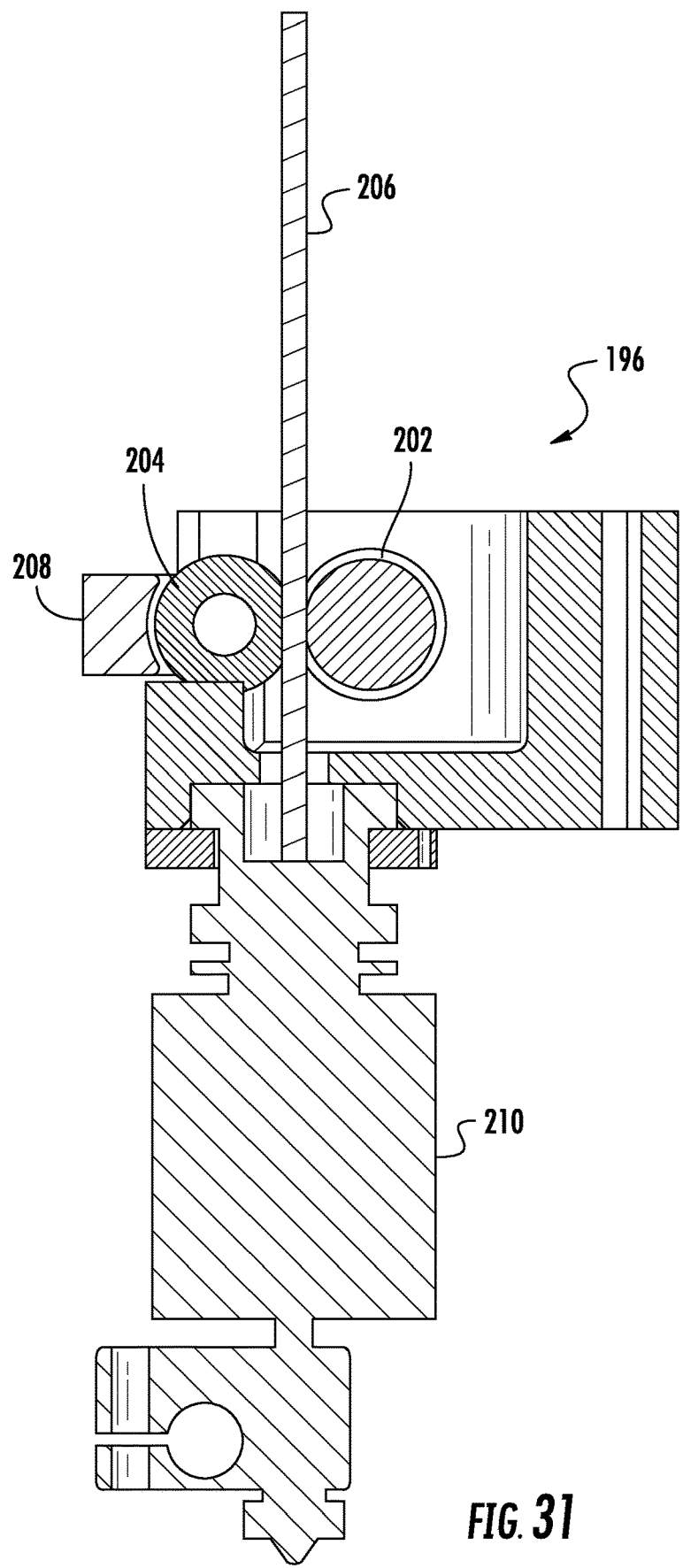
FIG. 31 is a longitudinal cross-section view of a portion of the print cartridge assembly as shown in FIG. 28.
Figure 32:
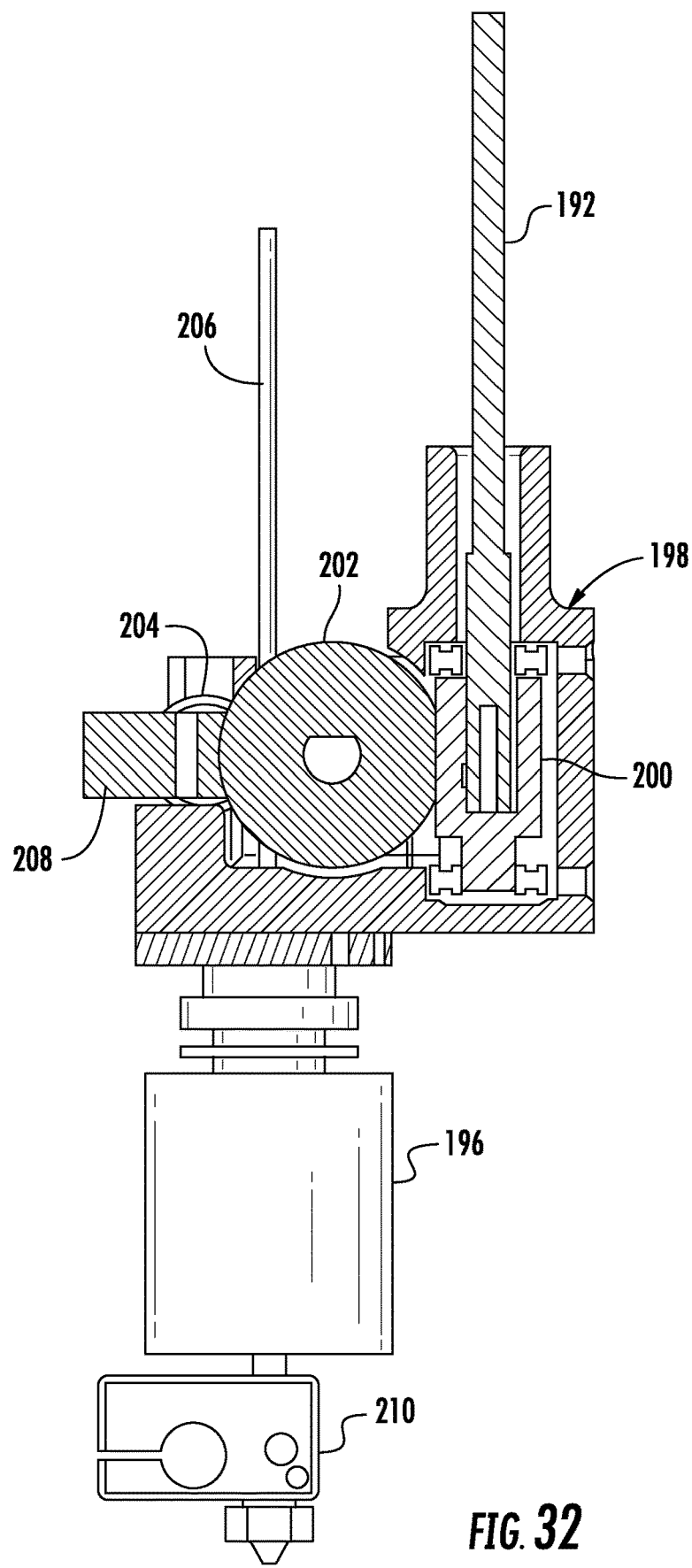
FIG. 32 is another longitudinal cross-section view of a portion of the print cartridge assembly as shown in FIG. 31.
Figure 33:
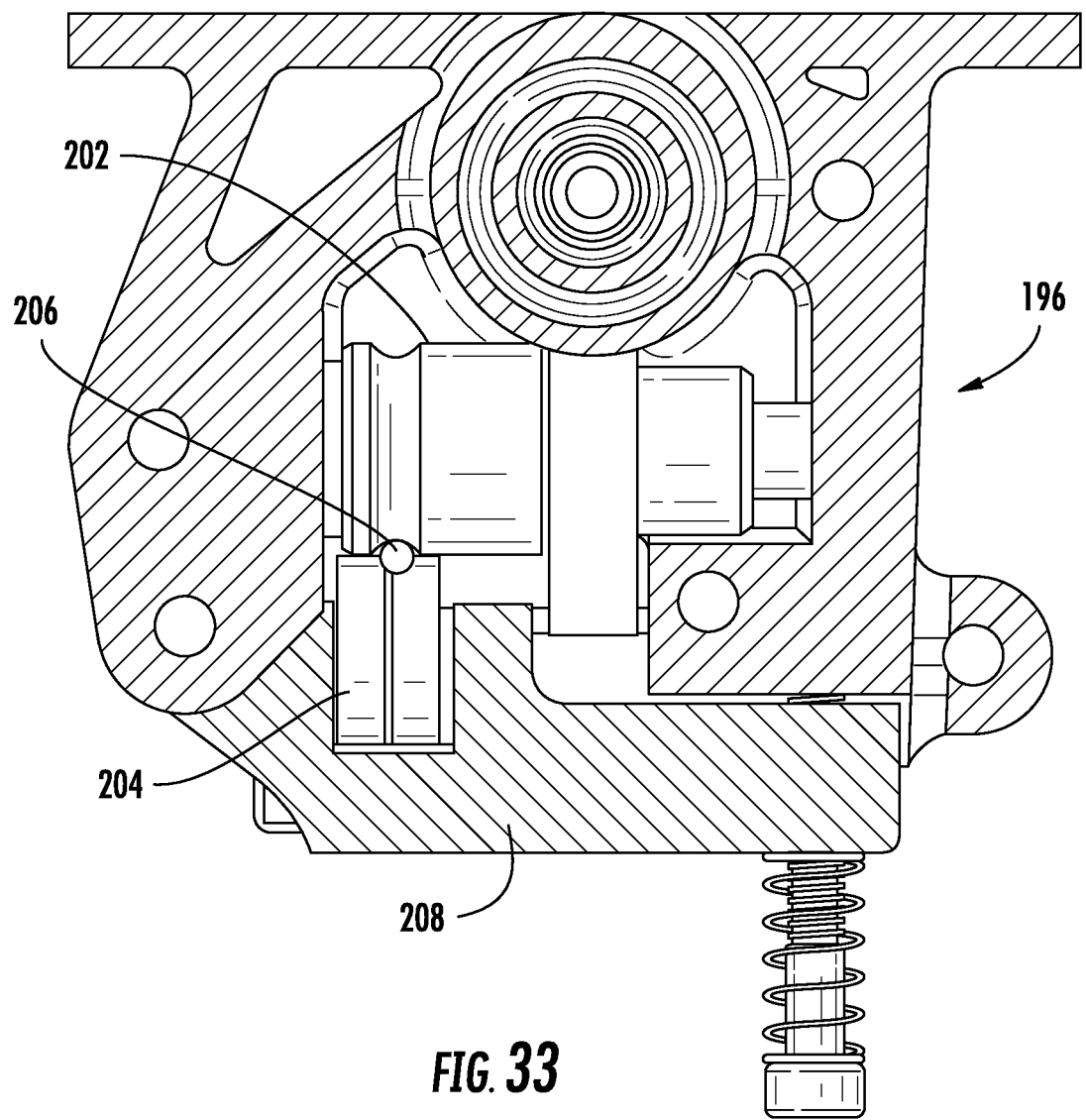
FIG. 33 is a transverse cross-section view of a portion of the print cartridge assembly as shown in FIG. 28.

The modeling material delivery system 180 includes a flexible filament feed. The modeling material may, for example, be supplied in solid form as a flexible filament wound on a supply reel spool to deliver a continuous strand of modeling material from a supply source, such as a reel, or a series of filament segments of modeling material, to the print carriage 90, such as through a flexible feed tube 184. Regardless of the form in which the feed stock material is supplied to the dispensing head, the material supply pump must be controllable so that the dispensing rate of the material can be controlled accurately to form the three-dimensional object. A conventional feed system is shown in FIG. 27 in combination with a Bowden extruder, including a print head having an inlet for receiving the filamentous modeling material and an outlet nozzle for dispensing the modeling material onto the platform in a flowable state. The nozzle outlet will typically be heated so as to deposit the modeling material at a predetermined temperature.

An embodiment of a remotely-driven, low-lash print head for thermoplastic extrusion is shown in FIGS. 28-33 and generally designated at 190. In this embodiment, the bowden tube 184 is replaced by a flexible torsional drive cable 192 extending between an extruder motor 194 and a print head 196. The driven end of the torsion cable 192 is attached directly to the extruder motor output shaft. The drive end of the torsion cable 192 is fitted into a gear reduction assembly 198 with a greater than a 10:1 ratio. In the embodiment shown, the gear reduction is a worm gear 200. Alternatively, a planetary gear reduction may be used. Depending on the orientation of the torsion cable 192, the worm gear 200 may be beneficial because it also rotates the power output by 90°. The torsion cable 192 is located on the input side of the gear reduction assembly 198. Because torsion cables typically have a large amount of angular distortion when they reverse directions, placing the torsion cable on the input side of the gear reduction assembly 198 cuts the angular distortion by the ratio of the gearbox. This significantly improves performance of the system and minimizes backlash effects.

A filament feed gear 202 is mounted on the print carriage 90 above the print head 190 and adjacent to the output shaft of the gear reduction assembly 198. The feed gear 202 is operatively connected in the gear train for turning the gear, which provides a driving force for feeding filament strands of modeling material through and driving the filament 206. A pinch wheel assembly 204 is used to retain the filament feed 206 against the feed gear 202. The pinch wheel assembly 204 comprises a pivoting toggle 208 which is spring-biased against the feed gear 202 such that the combination is configured to engage the filament 206. The toggle 208 is movable between a first closed position for capturing the filament 206 between the feed gear 202 and the pinch wheel 204 and a second open position. The feed gear 202 and the drive wheel 204 are driven by the gear reduction assembly 198, which is powered by the feed motor. When the toggle 208 is in the first closed position, rotation of the feed gear 202 continuously feeds filament strand 206 into a liquefier block 210. While traveling through liquefier block 210, the liquefier block 210 melts the filament strand 206 to a desired extrusion viscosity. The un-melted portion of the filament strand 206 acts as a plunger that forces the melted print material to extrude out of the nozzle 212 as liquefied material. This allows the print head 190 to dispense print material at a desired flow rate generally based on the rotation rate of the motor.

During delivery of print material, the temperature of the extruded print material is modulated within the extruded volume in close proximity to the print head 190. In order to achieve optimal performance (e.g. feature tolerances, geometry such as overhangs, etc) it is desirable to extrude the material in liquid form well above its melting point, such that the temperature of the deposited material, and the temperature of the surface on which it is deposited, are elevated enough to achieve good bonding between the layers. The deposited material is rapidly cooled to slightly above its glass transition temperature (Tg) in order to "set" the material and prevent distortion. Simultaneously, extracting too much heat is avoided so that the print material does not drop below its Tg and undergo contraction. Precisely controlling the rate of cooling is a critical aspect of high-speed printing, because the heat must be removed from the material in a shorter amount of time. A 3D printer relying on ambient cooling to accomplish heat removal does not work at faster print speeds.

FIGS. 28-33 show an apparatus comprising a small axial fan or centrifugal blower 220 mounted to the print head 196. A centrifugal blower is smaller in size and delivers a higher output pressure, which allows for reduction in air duct cross-sectional area and a smaller output orifice. The blower 220 pulls in ambient air for cooling purposes. The blower 220 is electrically connected to the on-board controller 68. The controller 68 is designed so that the blower 220 may be controlled at partial power settings, typically through a form of PWM (pulse width modulation), which can be set through the microcontroller. The fan power setting can also be controlled within a print file with a specific command, (e.g., M106 SXXX, where XXX is the PWM setting). A duct 222 is mounted on the outlet of the blower 220. The duct 222 directs the exhaust air of the blower 220 down towards the print head 196. The shape and outlet of the duct 222 are designed to direct the air down and across the axis of the print head 196 as the air exits the duct 222 at and below the nozzle. This ensures even coverage of the cooling air on both sides of the print head 196 even though the duct is located off-center relative to the print head. In a dual print head setup, a blower and duct may be provided for each print head to ensure adequate and even cooling of the deposited material from both print heads.

A method for thermal control comprises computing the time for each layer based on the toolpath for that layer when the solid model is prepared for printing (aka "sliced"). Processing software has configurable limits on what the allowable minimum layer time is, and these are adjustable on a per-material basis. If the layer time falls below a certain limit, the software calculates what level of cooling is required, and writes the appropriate command into the outputted print file. For each print material, settings are configured for minimum layer time, maximum allowable fan speed, minimum allowable fan speed (to prevent the fan from stalling at extremely low power levels), and optionally if the fan is configured to run constantly and at what power setting. These settings are determined experimentally by the manufacturer, user, or material supplier. As such, this is an "open loop" system in that the actual temperature of the deposited plastic is not measured.

A second method yields improved cooling results and takes into account the geometry of the part. For instance, parts with thin walls, such as vases, need less cooling for a given layer time, because the surface area to volume ratio is quite high. In contrast, parts with overhangs need additional cooling in order to produce optimal results because the overhanging sections are inclined to curl upwards. In this method, the software takes the part geometry into account when calculating the optimal fan setting, and adjusts the resulting value accordingly.

The 3D printer has many advantages, including a two-axis linear motion system which is highly scalable for larger or smaller applications while maintaining the core design and the associated cost, speed-of-motion and precision. In particular, the parallel linear motion guides may be positioned an arbitrary distance apart. The guide member is mounted to the carriage rollers and spans the gap between the linear motion guides. By adjusting the spacing between, and the length of, the linear motion guides, the swept area may be adjusted in both of the X and Y directions. In an ideal form, the front and rear plates, standoffs, and eccentric cams are designed to be 3D printed. This saves cost and reduces weight and allows part count to be reduced by combining separate parts. The plates can also be modified to provide attachments for other hardware, such as a print head or other tool. High performance of the 3D printer derives from high stiffness of the guide member and carriage subsystem, stationary motor drives, smooth motion, high movement speeds in excess of 1 meters per second, and low moving mass to minimize inertial effects and backlash within the system.

Although the apparatus and method for fabricating three-dimensional objects has been shown and described in considerable detail with respect to only a few exemplary embodiments thereof, it should be understood by those skilled in the art that we do not intend to limit the apparatus and method to the embodiments since various modifications, omissions and additions may be made to the disclosed embodiments without materially departing from the novel teachings and advantages, particularly in light of the foregoing teachings. For example, the apparatus and method may also have application in general purpose machine control. Accordingly, we intend to cover all such modifications, omission, additions and equivalents as may be included within the spirit and scope of the apparatus as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus for making three-dimensional physical objects of predetermined shape by sequentially depositing layers of solidifying material in a desired pattern, the apparatus comprising:
    a frame;
    a base member for receiving the solidifying material, the base member mounted to the frame for movement in a z-direction;
    a gantry assembly mounted to the frame for movement in an x, y plane orthogonal to the z-direction, the gantry assembly including
        a print carriage mounted to the gantry assembly for movement in the x, y plane, the print carriage including a dispensing head having a flow passage therein in flow communication at one end thereof with a dispensing outlet configured in the form of a tip with a discharge orifice for dispensing the solidifying material in a fluid state on the base member;
    a supply of flexible strand of thermoplastic resin material that solidifies by cooling to a solidification temperature upon being dispensed onto the base member;
    means for supplying the material in a fluid state through the flow passage to the dispensing outlet;
    a pair of motors mounted to the frame for moving the print carriage relative to the base member in the x,y plane in a predetermined sequence and pattern, each motor of the pair of motors comprising
        a rotating drive pulley, and
        a drive cable connected at each end of the drive cable to opposite sides of the print carriage, the drive pulley operatively advancing the drive cable upon rotation of the drive pulley in either direction; and
    means for metering the discharge of the material in a fluid state from the discharge orifice onto the base member as the dispensing head and base member are moved relative to each other so as to thus form a three-dimensional object,
    wherein the material is provided to the movable dispensing head in the form of a continuous flexible strand,
    wherein the means for supplying the material in a fluid state comprises a heater on the dispensing head proximate the flow passage that heats the flexible strand to a predetermined temperature above the solidification temperature of the material,
    wherein the means for metering comprises a material advance mechanism operatively associated with the flexible strand which controllably advances the flexible strand towards the flow passage at an advance rate controlled in relation to the mechanism, to thereby regulate the flow rate of the material in a fluid stream from the discharge orifice in relation to the relative movement of the discharge head and the base member, and wherein each drive pulley has an axial passage radially spaced from a central longitudinal axis of the drive pulley, and a transverse passage at each end of the pulley extending between the axial passage and a periphery of the pulley, wherein the drive cable is wrapped on the periphery of the pulley at one end of the pulley in a first direction, passes through the transverse passage at the one end of the pulley, passes through the axial passage, passes through the transverse passage at another end of the pulley and is wrapped on the periphery of the drive pulley at the other end of the pulley in a direction opposite to the first direction.

2. The apparatus as recited in claim 1, wherein the base member has a print surface, and further comprising a multi-zone heater for distributing power to a plurality of zones of the print surface for maintaining the print surface at a uniform temperature.

3. The apparatus as recited in claim 1, wherein each motor comprises a stepper motor.

4. The apparatus as recited in claim 1, wherein each motor comprises a closed-loop servomotor.

5. The apparatus as recited in claim 1, wherein the periphery of each drive pulley is smooth.

6. The apparatus as recited in claim 2, wherein the multi-zone heater comprises a kapton film.

7. The apparatus as recited in claim 2, wherein the multi-zone heater comprises a silicone mat resistance heater.

* * * * *